United States Patent
Liu et al.

(10) Patent No.: US 12,454,715 B2
(45) Date of Patent: Oct. 28, 2025

(54) AMINOACYL-tRNA SYNTHETASE EFFICIENTLY INTRODUCING LYSINE DERIVATIVES

(71) Applicant: SUZHOU KUNPENG BIOTECH CO., LTD., Jiangsu (CN)

(72) Inventors: Huiling Liu, Jiangsu (CN); Song Wu, Jiangsu (CN); Zhenshan Zhang, Jiangsu (CN); Wei Chen, Jiangsu (CN)

(73) Assignee: SUZHOU KUNPENG BIOTECH CO., LTD., Jiangsu (CN)

(*) Notice: Subject to any disclaimer, the term of this patent is extended or adjusted under 35 U.S.C. 154(b) by 979 days.

(21) Appl. No.: 17/594,841

(22) PCT Filed: Apr. 30, 2020

(86) PCT No.: PCT/CN2020/088506
§ 371 (c)(1),
(2) Date: Nov. 1, 2021

(87) PCT Pub. No.: WO2020/221365
PCT Pub. Date: Nov. 5, 2020

(65) Prior Publication Data
US 2022/0290202 A1    Sep. 15, 2022

(30) Foreign Application Priority Data
Apr. 30, 2019   (CN) .................. 201910364788.7

(51) Int. Cl.
| | |
|---|---|
| *C12P 21/02* | (2006.01) |
| *C12N 1/20* | (2006.01) |
| *C12N 9/00* | (2006.01) |
| *C12N 15/70* | (2006.01) |

(52) U.S. Cl.
CPC .............. *C12P 21/02* (2013.01); *C12N 1/20* (2013.01); *C12N 9/93* (2013.01); *C12N 15/70* (2013.01); *C12Y 601/01006* (2013.01); *C12N 2800/101* (2013.01)

(58) Field of Classification Search
CPC .. C12P 21/02; C12N 1/20; C12N 9/93; C12N 15/70; C12N 2800/101; C12N 15/62; C12Y 601/01006; C07K 14/62; C07K 2319/00
See application file for complete search history.

(56) References Cited

FOREIGN PATENT DOCUMENTS

| | | |
|---|---|---|
| CN | 1315512 A | 10/2001 |
| CN | 104718285 A | 6/2015 |
| CN | 107022568 A | 8/2017 |
| WO | 2010139948 A2 | 12/2010 |
| WO | 2019010164 A1 | 1/2019 |

OTHER PUBLICATIONS

Dr. Liu; "Chimeric pyrrolysyl-tRNA synthetase, SEQ ID 26"; Database Geneseq; [Online] Database accession No. BFZ56712; Mar. 7, 2019; pp. 1.
Dr. Liu; "Methanosarcina barkeri pyrrolysyl-tRNA synthetase, SEQ ID 20"; Database Geneseq [Online] Database accession No. BFZ56706; Mar. 7, 2019; pp. 1.
Jeffery, M. ; "tRNApyl: Structure, function, and applications"; RNA Biology; vol. 15, No. 4-5; Year: 2018; pp. 441-452.

*Primary Examiner* — Iqbal H Chowdhury
(74) *Attorney, Agent, or Firm* — NKL Law; Bin Lu; Allen Xue

(57) ABSTRACT

Provided by the present invention is a mutant lysyl-tRNA synthetase that has a deletion mutation at one or more sites selected from the group corresponding to the amino acid sequence of wild-type aminoacyl-tRNA synthetase: 102nd, 128th-140th, and 159th-179th amino acid residues. Compared with wild-type lysyl-tRNA synthetase, the mutant lysyl-tRNA synthetase according to the present invention has high activity, a high level of expression and good solubility, and may significantly increase the amount of an inserted unnatural amino acid and the level of expression of a target protein containing an unnatural amino acid.

3 Claims, 5 Drawing Sheets
Specification includes a Sequence Listing.

SEQUENCE LISTING

```
<160> NUMBER OF SEQ ID NOS: 14

<210> SEQ ID NO 1
<211> LENGTH: 454
<212> TYPE: PRT
<213> ORGANISM: Methanosarcina mazei

<400> SEQUENCE: 1

Met Asp Lys Lys Pro Leu Asn Thr Leu Ile Ser Ala Thr Gly Leu Trp
1               5                   10                  15

Met Ser Arg Thr Gly Thr Ile His Lys Ile Lys His His Glu Val Ser
            20                  25                  30

Arg Ser Lys Ile Tyr Ile Glu Met Ala Cys Gly Asp His Leu Val Val
        35                  40                  45

Asn Asn Ser Arg Ser Ser Arg Thr Ala Arg Ala Leu Arg His His Lys
    50                  55                  60

Tyr Arg Lys Thr Cys Lys Arg Cys Arg Val Ser Asp Glu Asp Leu Asn
65                  70                  75                  80

Lys Phe Leu Thr Lys Ala Asn Glu Asp Gln Thr Ser Val Lys Val Lys
                85                  90                  95

Val Val Ser Ala Pro Thr Arg Thr Lys Lys Ala Met Pro Lys Ser Val
                100                 105                 110

Ala Arg Ala Pro Lys Pro Leu Glu Asn Thr Glu Ala Ala Gln Ala Gln
            115                 120                 125

Pro Ser Gly Ser Lys Phe Ser Pro Ala Ile Pro Val Ser Thr Gln Glu
        130                 135                 140

Ser Val Ser Val Pro Ala Ser Val Ser Thr Ser Ile Ser Ser Ile Ser
145                 150                 155                 160

Thr Gly Ala Thr Ala Ser Ala Leu Val Lys Gly Asn Thr Asn Pro Ile
                165                 170                 175

Thr Ser Met Ser Ala Pro Val Gln Ala Ser Ala Pro Ala Leu Thr Lys
                180                 185                 190

Ser Gln Thr Asp Arg Leu Glu Val Leu Leu Asn Pro Lys Asp Glu Ile
            195                 200                 205

Ser Leu Asn Ser Gly Lys Pro Phe Arg Glu Leu Glu Ser Glu Leu Leu
        210                 215                 220

Ser Arg Arg Lys Lys Asp Leu Gln Gln Ile Tyr Ala Glu Glu Arg Glu
225                 230                 235                 240

Asn Tyr Leu Gly Lys Leu Glu Arg Glu Ile Thr Arg Phe Phe Val Asp
                245                 250                 255

Arg Gly Phe Leu Glu Ile Lys Ser Pro Ile Leu Ile Pro Leu Glu Tyr
            260                 265                 270

Ile Glu Arg Met Gly Ile Asp Asn Asp Thr Glu Leu Ser Lys Gln Ile
        275                 280                 285

Phe Arg Val Asp Lys Asn Phe Cys Leu Arg Pro Met Leu Ala Pro Asn
    290                 295                 300

Leu Tyr Asn Tyr Leu Arg Lys Leu Asp Arg Ala Leu Pro Asp Pro Ile
305                 310                 315                 320
```

Lys Ile Phe Glu Ile Gly Pro Cys Tyr Arg Lys Glu Ser Asp Gly Lys
            325                 330                 335

Glu His Leu Glu Glu Phe Thr Met Leu Asn Phe Cys Gln Met Gly Ser
            340                 345                 350

Gly Cys Thr Arg Glu Asn Leu Glu Ser Ile Ile Thr Asp Phe Leu Asn
            355                 360                 365

His Leu Gly Ile Asp Phe Lys Ile Val Gly Asp Ser Cys Met Val Tyr
        370                 375                 380

Gly Asp Thr Leu Asp Val Met His Gly Asp Leu Glu Leu Ser Ser Ala
385                 390                 395                 400

Val Val Gly Pro Ile Pro Leu Asp Arg Glu Trp Gly Ile Asp Lys Pro
                405                 410                 415

Trp Ile Gly Ala Gly Phe Gly Leu Glu Arg Leu Leu Lys Val Lys His
                420                 425                 430

Asp Phe Lys Asn Ile Lys Arg Ala Ala Arg Ser Glu Ser Tyr Tyr Asn
            435                 440                 445

Gly Ile Ser Thr Asn Leu
    450

<210> SEQ ID NO 2
<211> LENGTH: 454
<212> TYPE: PRT
<213> ORGANISM: Methanosarcina barkeri

<400> SEQUENCE: 2

Met Asp Lys Lys Pro Leu Asn Thr Leu Ile Ser Ala Thr Gly Leu Trp
1               5                   10                  15

Met Ser Arg Thr Gly Thr Ile His Lys Ile Lys His His Glu Val Ser
            20                  25                  30

Arg Ser Lys Ile Tyr Ile Glu Met Ala Cys Gly Asp His Leu Val Val
        35                  40                  45

Asn Asn Ser Arg Ser Ser Arg Thr Ala Arg Ala Leu Arg His His Lys
    50                  55                  60

Tyr Arg Lys Thr Cys Lys Arg Cys Arg Val Ser Asp Glu Asp Leu Asn
65                  70                  75                  80

Lys Phe Leu Thr Lys Ala Asn Glu Asp Gln Thr Ser Val Lys Val Lys
                85                  90                  95

Val Val Ser Ala Pro Thr Arg Thr Lys Lys Ala Met Pro Lys Ser Val
            100                 105                 110

Ala Arg Ala Pro Lys Pro Leu Glu Asn Thr Glu Ala Ala Gln Ala Gln
        115                 120                 125

Pro Ser Gly Ser Lys Phe Ser Pro Ala Ile Pro Val Ser Thr Gln Glu
    130                 135                 140

Ser Val Ser Val Pro Ala Ser Val Ser Thr Ile Ser Ser Ile Ser
145                 150                 155                 160

Thr Gly Ala Thr Ala Ser Ala Leu Val Lys Gly Asn Thr Asn Pro Ile
                165                 170                 175

Thr Ser Met Ser Ala Pro Val Gln Ala Ser Ala Pro Ala Leu Thr Lys
            180                 185                 190

Ser Gln Thr Asp Arg Leu Glu Val Leu Leu Asn Pro Lys Asp Glu Ile
        195                 200                 205

Ser Leu Asn Ser Gly Lys Pro Phe Arg Glu Leu Glu Ser Glu Leu Leu
    210                 215                 220

Ser Arg Arg Lys Lys Asp Leu Gln Gln Ile Tyr Ala Glu Glu Arg Glu
225                 230                 235                 240

Asn Tyr Leu Gly Lys Leu Glu Arg Glu Ile Thr Arg Phe Phe Val Asp
            245                 250                 255

Arg Gly Phe Leu Glu Ile Lys Ser Pro Ile Leu Ile Pro Leu Glu Tyr
            260                 265                 270

Ile Glu Arg Met Gly Ile Asp Asn Asp Thr Glu Leu Ser Lys Gln Ile
            275                 280                 285

Phe Arg Val Asp Lys Asn Phe Cys Leu Arg Pro Met Leu Ala Pro Asn
            290                 295                 300

Leu Tyr Asn Tyr Leu Arg Lys Leu Asp Arg Ala Leu Pro Asp Pro Ile
305                 310                 315                 320

Lys Ile Phe Glu Ile Gly Pro Cys Tyr Arg Lys Glu Ser Asp Gly Lys
            325                 330                 335

Glu His Leu Glu Glu Phe Thr Met Leu Asn Phe Cys Gln Met Gly Ser
            340                 345                 350

Gly Cys Thr Arg Glu Asn Leu Glu Ser Ile Ile Thr Asp Phe Leu Asn
            355                 360                 365

His Leu Gly Ile Asp Phe Lys Ile Val Gly Asp Ser Cys Met Val Tyr
370                 375                 380

Gly Asp Thr Leu Asp Val Met His Gly Asp Leu Glu Leu Ser Ser Ala
385                 390                 395                 400

Val Val Gly Pro Ile Pro Leu Asp Arg Glu Trp Gly Ile Asp Lys Pro
            405                 410                 415

Trp Ile Gly Ala Gly Phe Gly Leu Glu Arg Leu Leu Lys Val Lys His
            420                 425                 430

Asp Phe Lys Asn Ile Lys Arg Ala Ala Arg Ser Gly Ser Tyr Tyr Asn
            435                 440                 445

Gly Ile Ser Thr Asn Leu
            450

<210> SEQ ID NO 3
<211> LENGTH: 419
<212> TYPE: PRT
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: Mutant Lysyl-tRNA Synthetase

<400> SEQUENCE: 3

Met Asp Lys Lys Pro Leu Asn Thr Leu Ile Ser Ala Thr Gly Leu Trp
1               5                   10                  15

Met Ser Arg Thr Gly Thr Ile His Lys Ile Lys His His Glu Val Ser
            20                  25                  30

Arg Ser Lys Ile Tyr Ile Glu Met Ala Cys Gly Asp His Leu Val Val
            35                  40                  45

Asn Asn Ser Arg Ser Ser Arg Thr Ala Arg Ala Leu Arg His His Lys
            50                  55                  60

Tyr Arg Lys Thr Cys Lys Arg Cys Arg Val Ser Asp Glu Asp Leu Asn
65                  70                  75                  80

Lys Phe Leu Thr Lys Ala Asn Glu Asp Gln Thr Ser Val Lys Val Lys
            85                  90                  95

Val Val Ser Ala Pro Arg Thr Lys Lys Ala Met Pro Lys Ser Val Ala
            100                 105                 110

Arg Ala Pro Lys Pro Leu Glu Asn Thr Glu Ala Ala Gln Ala Ser Thr
            115                 120                 125

Gln Glu Ser Val Ser Val Pro Ala Ser Val Ser Thr Ser Ile Ser Ser
            130                 135                 140

Ser Ala Pro Val Gln Ala Ser Ala Pro Ala Leu Thr Lys Ser Gln Thr
145                 150                 155                 160

Asp Arg Leu Glu Val Leu Leu Asn Pro Lys Asp Glu Ile Ser Leu Asn
                165                 170                 175

Ser Gly Lys Pro Phe Arg Glu Leu Ser Glu Leu Leu Ser Arg Arg
            180                 185                 190

Lys Lys Asp Leu Gln Gln Ile Tyr Ala Glu Glu Arg Glu Asn Tyr Leu
            195                 200                 205

Gly Lys Leu Glu Arg Glu Ile Thr Arg Phe Phe Val Asp Arg Gly Phe
            210                 215                 220

Leu Glu Ile Lys Ser Pro Ile Leu Ile Pro Leu Glu Tyr Ile Glu Arg
225                 230                 235                 240

Met Gly Ile Asp Asn Asp Thr Glu Leu Ser Lys Gln Ile Phe Arg Val
                245                 250                 255

Asp Lys Asn Phe Cys Leu Arg Pro Met Leu Ala Pro Asn Leu Tyr Asn
                260                 265                 270

Tyr Leu Arg Lys Leu Asp Arg Ala Leu Pro Asp Pro Ile Lys Ile Phe
            275                 280                 285

Glu Ile Gly Pro Cys Tyr Arg Lys Glu Ser Asp Gly Lys Glu His Leu
            290                 295                 300

Glu Glu Phe Thr Met Leu Asn Phe Cys Gln Met Gly Ser Gly Cys Thr
305                 310                 315                 320

Arg Glu Asn Leu Glu Ser Ile Ile Thr Asp Phe Leu Asn His Leu Gly
                325                 330                 335

Ile Asp Phe Lys Ile Val Gly Asp Ser Cys Met Val Tyr Gly Asp Thr
            340                 345                 350

Leu Asp Val Met His Gly Asp Leu Glu Leu Ser Ser Ala Val Val Gly
            355                 360                 365

Pro Ile Pro Leu Asp Arg Glu Trp Gly Ile Asp Lys Pro Trp Ile Gly
370                 375                 380

Ala Gly Phe Gly Leu Glu Arg Leu Leu Lys Val Lys His Asp Phe Lys
385                 390                 395                 400

Asn Ile Lys Arg Ala Ala Arg Ser Glu Ser Tyr Tyr Asn Gly Ile Ser
                405                 410                 415

Thr Asn Leu

<210> SEQ ID NO 4
<211> LENGTH: 419
<212> TYPE: PRT
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: Mutant Lysyl-tRNA Synthetase

<400> SEQUENCE: 4

Met Asp Lys Lys Pro Leu Asp Val Leu Ile Ser Ala Thr Gly Leu Trp
1               5                   10                  15

Met Ser Arg Thr Gly Thr Leu His Lys Ile Lys His His Glu Ile Ser
                20                  25                  30

Arg Ser Lys Ile Tyr Ile Glu Met Ala Cys Gly Asp His Leu Val Val
            35                  40                  45

```
Asn Asn Ser Arg Ser Cys Arg Pro Ala Arg Ala Phe Arg Tyr His Lys
 50                  55                  60
Tyr Arg Lys Thr Cys Lys Arg Cys Arg Val Ser Asp Glu Asp Ile Asn
 65                  70                  75                  80
Asn Phe Leu Thr Arg Ser Thr Glu Ser Lys Asn Ser Val Lys Val Arg
                 85                  90                  95
Val Val Ser Glu Pro Lys Val Lys Lys Ala Met Pro Lys Ser Val Ser
            100                 105                 110
Arg Ala Pro Lys Pro Leu Glu Asn Ser Val Ser Ala Lys Ala Ser Thr
            115                 120                 125
Asn Thr Ser Arg Ser Val Pro Ser Pro Ala Lys Ser Thr Pro Asn Ser
130                 135                 140
Ser Val Pro Ala Ser Ala Ser Ala Pro Ala Leu Thr Lys Ser Gln Thr
145                 150                 155                 160
Asp Arg Leu Glu Val Leu Leu Asn Pro Lys Asp Glu Ile Ser Leu Asn
                165                 170                 175
Ser Gly Lys Pro Phe Arg Glu Leu Glu Ser Glu Leu Leu Ser Arg Arg
            180                 185                 190
Lys Lys Asp Leu Gln Gln Ile Tyr Ala Glu Glu Arg Glu Asn Tyr Leu
            195                 200                 205
Gly Lys Leu Glu Arg Glu Ile Thr Arg Phe Phe Val Asp Arg Gly Phe
210                 215                 220
Leu Glu Ile Lys Ser Pro Ile Leu Ile Pro Leu Glu Tyr Ile Glu Arg
225                 230                 235                 240
Met Gly Ile Asp Asn Asp Thr Glu Leu Ser Lys Gln Ile Phe Arg Val
                245                 250                 255
Asp Lys Asn Phe Cys Leu Arg Pro Met Leu Ala Pro Asn Leu Tyr Asn
            260                 265                 270
Tyr Leu Arg Lys Leu Asp Arg Ala Leu Pro Asp Pro Ile Lys Ile Phe
            275                 280                 285
Glu Ile Gly Pro Cys Tyr Arg Lys Glu Ser Asp Gly Lys Glu His Leu
            290                 295                 300
Glu Glu Phe Thr Met Leu Asn Phe Cys Gln Met Gly Ser Gly Cys Thr
305                 310                 315                 320
Arg Glu Asn Leu Glu Ser Ile Ile Thr Asp Phe Leu Asn His Leu Gly
                325                 330                 335
Ile Asp Phe Lys Ile Val Gly Asp Ser Cys Met Val Phe Gly Asp Thr
            340                 345                 350
Leu Asp Val Met His Gly Asp Leu Glu Leu Ser Ser Ala Val Val Gly
            355                 360                 365
Pro Ile Pro Leu Asp Arg Glu Trp Gly Ile Asp Lys Pro Trp Ile Gly
370                 375                 380
Ala Gly Phe Gly Leu Glu Arg Leu Leu Lys Val Lys His Asp Phe Lys
385                 390                 395                 400
Asn Ile Lys Arg Ala Ala Arg Ser Glu Ser Tyr Tyr Asn Gly Ile Ser
                405                 410                 415
Thr Asn Leu

<210> SEQ ID NO 5
<211> LENGTH: 419
<212> TYPE: PRT
<213> ORGANISM: Artificial Sequence
<220> FEATURE:
<223> OTHER INFORMATION: synhesized
<220> FEATURE:
```

<221> NAME/KEY: misc_feature
<223> OTHER INFORMATION: Mutant Lysyl-tRNA Synthetase

<400> SEQUENCE: 5

```
Met Asp Lys Lys Pro Leu Asp Val Leu Ile Ser Ala Thr Gly Leu Trp
1               5                   10                  15

Met Ser Arg Thr Gly Thr Leu His Lys Ile Lys His Tyr Glu Ile Ser
            20                  25                  30

Arg Ser Lys Ile Tyr Ile Glu Met Ala Cys Gly Asp His Leu Val Val
        35                  40                  45

Asn Asn Ser Arg Ser Cys Arg Pro Ala Arg Ala Phe Arg Tyr His Lys
    50                  55                  60

Tyr Arg Lys Thr Cys Lys Arg Cys Arg Val Ser Gly Glu Asp Ile Asn
65                  70                  75                  80

Asn Phe Leu Thr Arg Ser Thr Glu Gly Lys Thr Ser Val Lys Val Lys
                85                  90                  95

Val Val Ser Glu Pro Lys Val Lys Lys Ala Met Pro Lys Ser Val Ser
            100                 105                 110

Arg Ala Pro Lys Pro Leu Glu Asn Pro Val Ser Ala Lys Ala Ser Thr
        115                 120                 125

Asp Thr Ser Arg Ser Val Pro Ser Pro Ala Lys Ser Thr Pro Asn Ser
    130                 135                 140

Pro Val Pro Thr Ser Ala Ser Ala Pro Ala Leu Thr Lys Ser Gln Thr
145                 150                 155                 160

Asp Arg Leu Glu Val Leu Leu Asn Pro Lys Asp Glu Ile Ser Leu Asn
                165                 170                 175

Ser Gly Lys Pro Phe Arg Glu Leu Glu Ser Glu Leu Leu Ser Arg Arg
            180                 185                 190

Lys Lys Asp Leu Gln Gln Ile Tyr Ala Glu Glu Arg Glu Asn Tyr Leu
        195                 200                 205

Gly Lys Leu Glu Arg Glu Ile Thr Arg Phe Phe Val Asp Arg Gly Phe
    210                 215                 220

Leu Glu Ile Lys Ser Pro Ile Leu Ile Pro Leu Glu Tyr Ile Glu Arg
225                 230                 235                 240

Met Gly Ile Asp Asn Asp Thr Glu Leu Ser Lys Gln Ile Phe Arg Val
                245                 250                 255

Asp Lys Asn Phe Cys Leu Arg Pro Met Leu Ala Pro Asn Leu Tyr Asn
            260                 265                 270

Tyr Leu Arg Lys Leu Asp Arg Ala Leu Pro Asp Pro Ile Lys Ile Phe
        275                 280                 285

Glu Ile Gly Pro Cys Tyr Arg Lys Glu Ser Asp Gly Lys Glu His Leu
    290                 295                 300

Glu Glu Phe Thr Met Leu Asn Phe Cys Gln Met Gly Ser Gly Cys Thr
305                 310                 315                 320

Arg Glu Asn Leu Glu Ser Ile Ile Thr Asp Phe Leu Asn His Leu Gly
                325                 330                 335

Ile Asp Phe Lys Ile Val Gly Asp Ser Cys Met Val Phe Gly Asp Thr
            340                 345                 350

Leu Asp Val Met His Gly Asp Leu Glu Leu Ser Ser Ala Val Val Gly
        355                 360                 365

Pro Ile Pro Leu Asp Arg Glu Trp Gly Ile Asp Lys Pro Trp Ile Gly
    370                 375                 380

Ala Gly Phe Gly Leu Glu Arg Leu Leu Lys Val Lys His Asp Phe Lys
385                 390                 395                 400
```

Asn Ile Lys Arg Ala Ala Arg Ser Glu Ser Tyr Tyr Asn Gly Ile Ser
            405                 410                 415

Thr Asn Leu

<210> SEQ ID NO 6
<211> LENGTH: 419
<212> TYPE: PRT
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: Mutant Lysyl-tRNA Synthetase

<400> SEQUENCE: 6

Met Asp Lys Lys Pro Leu Asp Val Leu Ile Ser Ala Thr Gly Leu Trp
1               5                   10                  15

Met Ser Arg Thr Gly Thr Leu His Lys Ile Lys His His Glu Ile Ser
            20                  25                  30

Arg Ser Lys Ile Tyr Ile Glu Met Ala Cys Gly Asp His Leu Val Val
        35                  40                  45

Asn Asn Ser Arg Ser Cys Arg Pro Ala Arg Ala Phe Arg Tyr His Lys
    50                  55                  60

Tyr Arg Lys Thr Cys Lys Arg Cys Arg Val Ser Asp Glu Asp Ile Asn
65                  70                  75                  80

Asn Phe Leu Thr Arg Ser Thr Glu Ser Lys Asn Ser Val Lys Val Arg
                85                  90                  95

Val Val Ser Glu Pro Lys Val Lys Lys Ala Met Pro Lys Ser Val Ser
            100                 105                 110

Arg Ala Pro Lys Pro Leu Glu Asn Ser Val Ser Ala Lys Ala Ser Thr
        115                 120                 125

Asn Thr Ser Arg Ser Val Pro Ser Pro Ala Lys Ser Thr Pro Asn Ser
    130                 135                 140

Ser Val Pro Ala Ser Ala Ser Ala Pro Ala Leu Thr Lys Ser Gln Thr
145                 150                 155                 160

Asp Arg Leu Glu Val Leu Leu Asn Pro Lys Asp Glu Ile Ser Leu Asn
                165                 170                 175

Ser Gly Lys Pro Phe Arg Glu Leu Glu Ser Glu Leu Leu Ser Arg Arg
            180                 185                 190

Lys Lys Asp Leu Gln Gln Ile Tyr Ala Glu Glu Arg Glu Asn Tyr Leu
        195                 200                 205

Gly Lys Leu Glu Arg Glu Ile Thr Arg Phe Phe Val Asp Arg Gly Phe
    210                 215                 220

Leu Glu Ile Lys Ser Pro Ile Leu Ile Pro Leu Glu Tyr Ile Glu Arg
225                 230                 235                 240

Met Gly Ile Asp Asn Asp Thr Glu Leu Ser Lys Gln Ile Phe Arg Val
                245                 250                 255

Asp Lys Asn Phe Cys Leu Arg Pro Met Leu Ala Pro Asn Leu Tyr Asn
            260                 265                 270

Tyr Ala Arg Lys Leu Asp Arg Ala Leu Pro Asp Pro Ile Lys Ile Phe
        275                 280                 285

Glu Ile Gly Pro Cys Tyr Arg Lys Glu Ser Asp Gly Lys Glu His Leu
    290                 295                 300

Glu Glu Phe Thr Met Leu Asn Phe Ser Gln Met Gly Ser Gly Cys Thr
305                 310                 315                 320

```
Arg Glu Asn Leu Glu Ser Ile Ile Thr Asp Phe Leu Asn His Leu Gly
                325                 330                 335

Ile Asp Phe Lys Ile Val Gly Asp Ser Cys Met Val Tyr Gly Asp Thr
            340                 345                 350

Leu Asp Val Met His Gly Asp Leu Glu Leu Ser Ser Ala Val Val Gly
        355                 360                 365

Pro Ile Pro Leu Asp Arg Glu Trp Gly Ile Asp Lys Pro Trp Ile Gly
    370                 375                 380

Ala Gly Phe Gly Leu Glu Arg Leu Leu Lys Val Lys His Asp Phe Lys
385                 390                 395                 400

Asn Ile Lys Arg Ala Ala Arg Ser Glu Ser Tyr Tyr Asn Gly Ile Ser
            405                 410                 415

Thr Asn Leu

<210> SEQ ID NO 7
<211> LENGTH: 72
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of the Unnatural tRNA pylT

<400> SEQUENCE: 7
ggaaacctga tcatgtagat cgaatggact ctaaatccgt tcagccgggt tagattcccg    60
gggtttccgc ca                                                        72

<210> SEQ ID NO 8
<211> LENGTH: 1365
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of pylRs

<400> SEQUENCE: 8
atggataaga aaccgctgaa tactctgatt tctgcaactg gtctgtggat gagccgtacc    60
ggcaccatcc acaagatcaa acaccacgag gtttcccgta gcaaaatcta catcgaaatg    120
gcgtgcggtg accacctggt ggtaaacaac tcccgttctt ctcgtactgc acgtgctctg    180
cgccaccaca gtaccgtaaa gacctgcaag cgctgtcgcg tgtctgatga agaccctgaac   240 aaattcctga ctaaagcgaa cgaagatcag acttctgtga aggtgaaagt tgtttctgcc    300
ccaacccgca ccaagaaagc gatgccgaag tccgttgcac gcgctccgaa accgctggag    360
aacaccgaag ccgcacaggc ccagccgtct ggttctaagt tttctccggc aatcccggtt    420
tctactcagg agtctgtgtc tgtgccagct tctgttagca cttctatttc ctctatcagc    480
actggtgcga ctgcgtccgc tctggtaaaa ggtaacacta cccgatcac cagcatgtct    540 gctccggttc aggcttctgc accggcactg actaaaagcc agactgaccg tctggaggtt    600
ctgctgaacc cgaaagatga aatcagcctg aactctggca aaccgttccg tgaactggaa    660
tccgaactgc tgtctcgtcg taagaaagac ctgcaacaaa tctatgctga agagcgtgaa    720
aactacctgg gtaaactgga acgtgaaatc acccgtttct ttgtggaccg tggtttcctg    780
gaaatcaagt ctccgatcct gatcccgctg gaatacatcg agcgcatggg tattgataac    840
gacaccgaac tgtccaagca gatttttcgt gtggacaaga acttctgcct gcgtccgatg    900
```

```
ctggcaccga acctgtacaa ttacctgcgt aaactggatc gtgcactgcc ggacccgatc    960
aaaatctttg aaatcggtcc atgctatcgt aaggagagcg acggtaaaga acacctggaa   1020
gagttcacta tgctgaactt ttgtcagatg ggttctggct gcacccgtga aaatctggaa   1080
tctatcatca ccgacttcct gaaccacctg ggcattgact tcaaaatcgt tggtgattcc   1140
tgcatggttt acggtgacac tctggacgtt atgcatggtg atctggaact gagcagcgct   1200
gttgtgggtc cgattccgct ggatcgtgaa tggggtatcg ataaaccgtg gattggtgct   1260
ggcttcggtc tggaacgtct gctgaaagtt aagcacgact ttaagaacat caaacgtgct   1320
gcgcgttccg agtcctatta caacggcatt agcactaacc tgtaa                   1365
```

<210> SEQ ID NO 9
<211> LENGTH: 1260
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of IPYEpylRs

<400> SEQUENCE: 9

```
atggataaga agccactgga tgttctgatt ccgctactg gtctgtggat gtctcgcact      60
ggtactctgc acaagatcaa acaccacgaa atctctcgct ccaagatcta cattgaaatg    120
gcttgtggtg atcacctggt tgttaacaac tcccgctctt gtcgcccggc tcgtgcgttt    180
cgctatcaca aatatcgtaa aacctgcaaa cgctgccgcg tgagcgatga ggatattaac    240
aacttcctga ctcgctccac cgagagcaag aactctgtga agttcgcgt agtttctgaa    300 ccgaaagtta agaaagctat gccgaagtct gttagccgtg ctccgaaacc gctggagaac    360
tctgtgtccg cgaaagcgag caccaacacc agccgttctg ttccgtctcc agcgaaatct    420
actccgaact ctagcgtgcc agcttccgct tctgcaccgg cactgactaa agccagact     480 gaccgtctgg aggttctgct gaacccgaaa gatgaaatca gcctgaactc tggcaaaccg    540
ttccgtgaac tggaatccga actgctgtct cgtcgtaaga agacctgca acaaatctat     600 gctgaagagc gtgaaaacta cctgggtaaa ctggaacgtg aaatcacccg tttctttgtg    660
gaccgtggtt tcctggaaat caagtctccg atcctgatcc cgctgaata catcgagcgc    720 atgggtattg ataacgacac cgaactgtcc aagcagattt ccgtgtgga caagaacttc    780 tgcctgcgtc cgatgctggc accgaacctg tacaattacc tgcgtaaact ggatcgtgca    840
ctgccggacc cgatcaaaat ctttgaaatc ggtccatgct atcgtaagga gagcgacggt    900
aaagaacacc tggaagagtt cactatgctg aactttttgtc agatgggttc tggctgcacc    960
cgtgaaaatc tggaatctat catcaccgac ttcctgaacc acctgggcat tgacttcaaa   1020
atcgttggtg attcctgcat ggttttcggt gacactctgg acgttatgca tggtgatctg   1080
gaactgagca gcgctgttgt gggtccgatt ccgctggatc gtgaatgggg tatcgataaa   1140
ccgtggattg gtgctggctt cggtctggaa cgtctgctga agttaagca cgactttaag   1200 aacatcaaac gtgctgcgcg ttccgagtcc tattacaacg gcattagcac taacctgtaa   1260
```

<210> SEQ ID NO 10
<211> LENGTH: 72
<212> TYPE: DNA
<213> ORGANISM: Artificial Sequence
<220> FEATURE:
<223> OTHER INFORMATION: synhesized

```
<220> FEATURE:
<221> NAME/KEY: misc_feature
<223> OTHER INFORMATION: DNA Sequence of Glutamine Promoter glnS

<400> SEQUENCE: 10
ttttaaaaaa ctaacagttg tcagcctgtc ccgctttaat atcatacgcc gttatacgtt        60
gtttacgctt tg                                                           72

<210> SEQ ID NO 11
<211> LENGTH: 45
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of Promoter proK

<400> SEQUENCE: 11
caaacaatcc aaaacgccgc gttcagcggc gtttttctg ctttt                        45

<210> SEQ ID NO 12
<211> LENGTH: 151
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of Terminator of Promoter glnS

<400> SEQUENCE: 12
tgtgcttctc aaatgcctga ggccagtttg ctcaggctct ccccgtggag gtaataattg        60
acgatatgat cagtgcacgg ctaactaagc ggcctgctga cttctcgcc gatcaaaagg       120 cattttgcta ttaagggatt gacgagggcg t                                     151

<210> SEQ ID NO 13
<211> LENGTH: 40
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of Terminator of Promoter proK

<400> SEQUENCE: 13
aattcgaaaa gcctgctcaa cgagcaggct tttttgcatg                             40

<210> SEQ ID NO 14
<211> LENGTH: 1798
<212> TYPE: DNA
<213> ORGANISM: Artificial Sequence
<220> FEATURE:
<223> OTHER INFORMATION: synhesized
<220> FEATURE:
<221> NAME/KEY: misc_feature
<223> OTHER INFORMATION: DNA Sequence of glnS [pylRs]-proK [pylT]

<400> SEQUENCE: 14
ttttaaaaaa ctaacagttg tcagcctgtc ccgctttaat atcatacgcc gttatacgtt        60
gtttacgctt tgaggaatcc catatggata agaaaccgct gaatactctg atttctgcaa      120
ctggtctgtg gatgagccgt accggcacca tccacaagat caaacaccac gaggtttccc      180
gtagcaaaat ctacatcgaa atggcgtgcg gtgaccacct ggtggtaaac aactcccgtt      240
```

```
cttctcgtac tgcacgtgct ctgcgccacc acaagtaccg taagacctgc aagcgctgtc    300
gcgtgtctga tgaagacctg aacaaattcc tgactaaagc gaacgaagat cagacttctg    360
tgaaggtgaa agttgtttct gccccaaccc gcaccaagaa agcgatgccg aagtccgttg    420
cacgcgctcc gaaaccgctg gagaacaccg aagccgcaca ggcccagccg tctggttcta    480
agttttctcc ggcaatcccg gtttctactc aggagtctgt gtctgtgcca gcttctgtta    540
gcacttctat ttcctctatc agcactggtg cgactgcgtc cgctctggta aaaggtaaca    600
ctaacccgat caccagcatg tctgctccgg ttcaggcttc tgcaccggca ctgactaaaa    660
gccagactga ccgtctggag gttctgctga acccgaaaga tgaaatcagc ctgaactctg    720
gcaaaccgtt ccgtgaactg gaatccgaac tgctgtctcg tcgtaagaaa gacctgcaac    780
aaatctatgc tgaagagcgt gaaaactacc tgggtaaact ggaacgtgaa atcacccgtt    840
tctttgtgga ccgtggtttc ctggaaatca gtctccgat cctgatcccg ctggaataca    900
tcgagcgcat gggtattgat aacgacaccg aactgtccaa gcagattttc cgtgtggaca    960
agaacttctg cctgcgtccg atgctggcac cgaacctgta caattacctg cgtaaactgg    1020
atcgtgcact gccggacccg atcaaaatct ttgaaatcgg tccatgctat cgtaaggaga    1080
gcgacggtaa agaacacctg gaagagttca ctatgctgaa cttttgtcag atgggttctg    1140
gctgcacccg tgaaaatctg gaatctatca tcaccgactt cctgaaccac ctgggcattg    1200
acttcaaaat cgttggtgat tcctgcatgg tttacggtga cactctggac gttatgcatg    1260
gtgatctgga actgagcagc gctgttgtgg gtccgattcc gctggatcgt gaatggggta    1320
tcgataaacc gtggattggt gctggcttcg gtctggaacg tctgctgaaa gttaagcacg    1380
actttaagaa catcaaacgt gctgcgcgtt ccgagtccta ttacaacggc attagcacta    1440
acctgtaagt cgaccaaaca atccaaaacg ccgcgttcag cggcgttttt tctgcttttg    1500
cggccgctgt gcttctcaaa tgcctgaggc cagtttgctc aggctctccc cgtggaggta    1560
ataattgacg atatgatcag tgcacggcta actaagcggc ctgctgactt tctcgccgat    1620
caaaaggcat tttgctatta agggattgac gagggcgtat ctgcgcagta agatgcgccc    1680
cgcattggaa acctgatcat gtagatcgaa tggactctaa atccgttcag ccgggttaga    1740
ttcccggggt ttccgccaaa ttcgaaaagc ctgctcaacg agcaggcttt tttgcatg     1798
```

AMINOACYL-tRNA SYNTHETASE EFFICIENTLY INTRODUCING LYSINE DERIVATIVES

INCORPORATION OF SEQUENCE LISTING

This application contains a sequence listing submitted in Computer Readable Form (CRF). The CFR file containing the sequence listing entitled "PBA4085106_ST25.txt", which was created on Oct. 29, 2021, and is 31,062 bytes in size. The information in the sequence listing is incorporated herein by reference in its entirety.

TECHNICAL FIELD

The present invention relates to the field of biotechnology, and in particular to an aminoacyl-tRNA synthetase that efficiently introduces a lysine derivative.

BACKGROUND

The unnatural amino acid integrated protein (whole protein), which is obtained by replacing an amino acid residue at the desired position in a protein with the amino acids other than 20 types of amino acid used in normal protein synthesis (i.e., unnatural amino acids), can be used as an effective means for analysis of protein structure and function. Using aminoacyl-tRNA synthetase (aaRS)/tRNA pairs derived from various biological species, more than 30 types of whole proteins have been synthesized. The system with the longest history and useful for introduction of many useful unnatural amino acids is the tyrosyl-tRNA synthetase (TyrRS) mutant and amber suppressor gene tRNA$^{Tyr}$ pair. As for this method, the key is its orthogonal relationship, that is, aaRS in the two groups of eubacteria, archaea and eukaryotes can aminoacylate tRNA in their respective group, but can not aminoacylate tRNA in the other group.

On the other hand, the pyrrolysyl-tRNA synthetase (PylRS) and the amber suppressor gene tRNAPyl derived from *Methanosarcina mazei* can function as an orthogonal aaRS/tRNA pair in *Escherichia coli* cells. Pyrrolysine is a lysine derivative with a bulky methylpyrroline moiety on the side chain. The Wild-type PylRS can bind Nc-Boc-L-lysine to tRNAPyl in *Escherichia coli*. However, since LysRS has strict recognition of lysine, it is difficult to introduce lysine derivatives having functional groups of various sizes and shapes into proteins site-specifically.

Therefore, it is desired in the art to modify the wild-type lysyl-tRNA synthetase and develop an aminoacyl-tRNA synthetase that efficiently introduces lysine derivatives into proteins.

SUMMARY OF THE INVENTION

The purpose of the present invention is to provide an aminoacyl-tRNA synthetase and a method for efficiently introducing lysine derivatives into proteins.

In the first aspect of the present invention, it provides a mutant protein of aminoacyl-tRNA synthetase, which comprises a deletion mutation of amino acid residue at one or more positions selected from the group consisting of: position 102, positions 128-140, and positions 159-179 in an amino acid sequence corresponding to a wild-type aminoacyl-tRNA synthetase.

In another preferred embodiment, the more positions comprise: 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33 and 34 positions.

In another preferred embodiment, the positions 128-140 comprise position 128, 129, 130, 131, 132, 133, 134, 135, 136, 137, 138, 139 and 140.

In another preferred embodiment, the positions 159-179 comprise position 159, 160, 161, 162, 163, 164, 165, 166, 167, 168, 169, 170, 171, 172, 173, 174, 175, 176, 177, 178, 179, and 180.

In another preferred embodiment, at least one of the following amino acid residues in the amino acid sequence of wild-type aminoacyl-tRNA synthetase is truncated in the mutant protein:
(a) an amino acid residue at position 102;
(b) amino acid residues at positions X to Y, wherein X is a positive integer of 128-132, and Y is a positive integer of 133-140; and/or
(c) amino acid residues at positions A to B, wherein A is a positive integer of 159-164, and B is a positive integer of 165-179.

In another preferred embodiment, X is a positive integer of 128-132, such as 128, 129, 130, 131 or 132.

In another preferred embodiment, X is 128.

In another preferred embodiment, Y is a positive integer of 133-140, such as 133, 134, 135, 136, 137, 138, 139 or 140.

In another preferred embodiment, Y is 140.

In another preferred embodiment, A is a positive integer of 159-164, such as 159, 160, 161, 162, 163 or 164.

In another preferred embodiment, A is 159.

In another preferred embodiment, B is a positive integer of 165-179, such as 165, 166, 167, 168, 169, 170, 171, 172, 173, 174, 175, 176, 177, 178 or 164.

In another preferred embodiment, the B is 179.

In another preferred embodiment, the wild-type aminoacyl-tRNA synthetase is derived from *Methanosarcina mazei*, *Methanosarcina barkeri*, or *Methanosarcina acetivorans* of *Methanogenic archaea*.

In another preferred embodiment, the amino acid sequence of the wild-type aminoacyl-tRNA synthetase is shown in SEQ ID NO: 1 or 2.

In another preferred embodiment, the numbering of the deleted amino acid residue is based on SEQ ID NO: 1 or 2.

In another preferred embodiment, the mutant protein is a truncated aminoacyl-tRNA synthetase.

In another preferred embodiment, the length of amino acid sequence of the mutant protein is at least 90%, preferably 92%-99%, of the length of the sequence as shown in SEQ ID NO: 1 or 2.

In another preferred embodiment, the amino acid sequence of the mutant protein (or truncated form) has at least 90%, 95%, 96%, 97%, 98%, or 99% sequence identity to a peptide fragment of SEQ ID NO: 1 or 2 having the corresponding length.

In another preferred embodiment, in the mutant protein, at least the amino acid residues at positions 128-140 and positions 159-179 in the amino acid sequence of wild-type aminoacyl-tRNA synthetase are truncated.

In another preferred embodiment, the amino acid sequence of the mutant protein is shown in SEQ ID NO: 3.

In another preferred embodiment, the amino acid sequence of the mutant protein is shown in SEQ ID NO: 4.

In another preferred embodiment, compared with the sequence of the mutant aminoacyl-tRNA synthetase as shown in SEQ ID NO: 4, the mutant protein further comprises an amino acid mutation selected from the group consisting of: histidine (H) at position 29, aspartic acid (D) at position 76, serine (S) at position 89, asparagine (N) at position 91, arginine (R) at position 96, serine (S) at position 121, Asparagine (N) at position 129, Serine (S) at position 145, Alanine (A) at position 148, Leucine (L) at position 274, Cysteine (C) at position 313, Phenylalanine (F) at position 349, and combinations thereof.

In another preferred embodiment, the numbering of the deleted amino acid residues is based on SEQ ID NO: 4.

In another preferred embodiment, the mutant protein is a mutant aminoacyl tRNA synthase having the sequence as shown in SEQ ID NO: 4, and based on the sequence as shown in SEQ ID NO: 4, it further comprises an amino acid mutation selected from the group consisting of: histidine (H) at position 29, aspartic acid (D) at position 76, serine (S) at position 89, asparagine (N) at position 91, arginine (R) at position 96, serine (S) at position 121, Asparagine (N) at position 129, Serine (S) at position 145, Alanine (A) at position 148, Leucine (L) at position 274, Cysteine (C) at position 313, Phenylalanine (F) at position 349, and combinations thereof.

In another preferred embodiment, the histidine (H) at position 29 is mutated to tyrosine (Y); and/or
the aspartic acid (D) at position 76 is mutated to glycine (G); and/or
the serine (S) at position 89 is mutated to glycine (G); and/or
the asparagine (N) at position 91 is mutated to threonine (T); and/or
the arginine (R) at position 96 is mutated to lysine (K); and/or
the serine (S) at position 121 is mutated to proline (P); and/or
the asparagine (N) at position 129 is mutated to aspartic acid (D); and/or
the serine (S) at position 145 is mutated to proline (P); and/or
the alanine (A) at position 148 is mutated to threonine (T); and/or
the leucine (L) at position 274 is mutated to alanine (A); and/or
the cysteine (C) at position 313 is mutated to serine (S); and/or
the phenylalanine (F) at position 349 is mutated to tyrosine (Y).

In another preferred embodiment, compared with the sequence of the mutant aminoacyl-tRNA synthetase as shown in SEQ ID NO: 4, the mutant protein further comprises an amino acid mutation selected from the group consisting of: H29Y, D76G, S89G, N91T, R96K, S121P, N129D, S145P, A148T, L274A, C313S, F349Y, and combinations thereof.

In another preferred embodiment, compared with the sequence of the mutant aminoacyl-tRNA synthetase as shown in SEQ ID NO: 4, the mutant protein further comprises a mutation selected from the group consisting of: H29Y, D76G, S89G, N91T, R96K, S121P, N129D, S145P and A148T.

In another preferred embodiment, compared with the sequence of the mutant aminoacyl-tRNA synthetase as shown in SEQ ID NO: 4, the mutant protein further comprises a mutation selected from the group consisting of: L274A, C313S, and F349Y.

In another preferred embodiment, the amino acid sequence of the mutant protein is shown in SEQ ID NO: 5 or 6.

In another preferred embodiment, except for the deletion and the mutation, the other amino acids of the mutant protein are the same or substantially the same as the sequence as shown in SEQ ID NO: 1 or SEQ ID NO: 2.

In another preferred embodiment, the term "substantially the same" means that at most 50 (preferably 1-20, more preferably 1-10) amino acids are different, wherein the difference comprises amino acid substitution, deletion or addition, and the mutant protein still has the activity of aminoacyl-tRNA synthetase.

In another preferred embodiment, the amino acid sequence of the mutant protein has at least 70%, preferably at least 75%, 80%, 85%, 90%, and more preferably at least 95%, 96%, 97%, 98%, 99% sequence identity to SEQ ID NO: 1 or SEQ ID NO: 2.

In another preferred embodiment, the mutant protein is formed by mutation of the wild-type aminoacyl-tRNA synthetase as shown in SEQ ID NO: 1 or SEQ ID NO: 2.

In another preferred embodiment, the mutant protein is selected from the group consisting of:
(1) a polypeptide having an amino acid sequence as shown in any one of SEQ ID NOs: 3-6; or
(2) a polypeptide derived from a polypeptide having the amino acid sequence as shown in any one of SEQ ID NOs: 3-6, which is formed by substituting, deleting or adding one or more (preferably 1-20, more preferably 1-15, more preferably 1-10, more preferably 1-8, more preferably 1-3, and most preferably 1) amino acid residues to the amino acid sequence as shown in any one of SEQ ID NOs: 3-6, and has the function of the polypeptide as described in (1).

In another preferred embodiment, the amino acid sequence of the mutant protein is shown in any one of SEQ ID NOs: 3-6.

In another preferred embodiment, the mutant protein is an unnatural protein.

In another preferred embodiment, the mutant protein is used to introduce a predetermined modified amino acid into a target protein.

In another preferred embodiment, the mutant protein has one or more following characteristics:
(a) compared with wild-type aminoacyl-tRNA synthetase, a predetermined modified amino acid with large functional groups can be introduced into a protein;
(b) the target protein has a high level of expression; and
(c) the mutant protein has shorter sequence length, thereby making it easier to express, and has a high level of expression.

In the second aspect of the present invention, it provides an isolated polynucleotide encoding the mutant protein according to the first aspect of the present invention.

In another preferred embodiment, the polynucleotide encodes a polypeptide as shown in any one of SEQ ID NOs: 3-6.

In another preferred example, the polynucleotide encodes a polypeptide as shown in SEQ ID NO: 4, and its nucleotide sequence is shown in SEQ ID NO: 9.

In another preferred embodiment, the polynucleotide comprises a DNA sequence, an RNA sequence, and combinations thereof.

In another preferred embodiment, the polynucleotide additionally contains an auxiliary element on the flanking of ORF of the mutant aminoacyl-tRNA synthetase selected from the group consisting of: signal peptide, secretory peptide, tag sequence (such as 6His), and combinations thereof.

In the third aspect of the present invention, it provides a vector containing the polynucleotide according to the second aspect of the present invention.

In another preferred embodiment, the vector comprises an expression vector, a shuttle vector, and an integration vector.

In another preferred embodiment, the vector is selected from the group consisting of: pET, pCW, pUC, pPIC9k, pMA5, and combinations thereof.

In another preferred embodiment, the vector is pEvol vector and/or pBAD vector.

In another preferred embodiment, the vector is used to express the mutant protein according to the first aspect of the present invention.

In the fourth aspect of the present invention, it provides a host cell which contains the vector according to the third aspect of the present invention, or has the polynucleotide according to the second aspect of the present invention integrated into its genome, or expresses the mutant protein according to the first aspect of the present invention.

In another preferred embodiment, the host cell is selected from the group consisting of a prokaryotic cell, a eukaryotic cell, and combinations thereof.

In another preferred embodiment, the host cell is a eukaryotic cell, such as a yeast cell, a plant cell, or an animal cell (such as a mammalian cell).

In another preferred embodiment, the host cell is a prokaryotic cell, such as *Escherichia coli*.

In another preferred embodiment, the host cell is *Escherichia coli* Top10 or BL21.

In another preferred embodiment, the host cell comprises:
(a) the mutant protein according to the first aspect of the present invention; and
(b) an artificial tRNA capable of binding to a predetermined modified amino acid in the presence of the mutant protein; and optionally
(c) a first nucleic acid sequence encoding a target protein, wherein the first nucleic acid sequence comprises a codon recognized by the artificial tRNA.

In another preferred embodiment, the host cell further comprises:
(d) a predetermined modified amino acid.

In another preferred embodiment, the first nucleic acid sequence contains a codon recognized by the artificial tRNA at a position for introducing a predetermined modified amino acid.

In another preferred embodiment, the predetermined modified amino acid is a substrate of the mutant protein.

In another preferred embodiment, the predetermined modified amino acid is a lysine with a modified group.

In another preferred embodiment, the modified amino acid is selected from the group consisting of: alkynyloxycarbonyl lysine derivative, t-butyloxycarboryl-L-lysine (BOC-lysine) derivative, fatty acylated lysine, and combinations thereof.

In another preferred embodiment, the structure of the alkynyloxycarbonyl lysine is shown in Formula I:

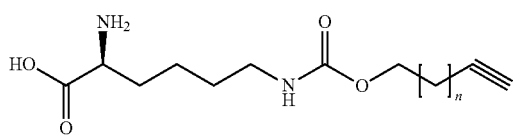

I wherein n is 0-8.

In another preferred embodiment, the artificial tRNA is suppressor tRNA, and preferably amber suppressor tRNA.

In another preferred embodiment, the encoding nucleic acid sequence of the artificial tRNA is shown in SEQ ID NO: 7.

```
                                        (SEQ ID NO: 7)
GGAAACCTGATCATGTAGATCGAATGGACTCTAAA

TCCGTTCAGCCGGGTTAGATTCCCGGGGTTTCCGC

CA
```

In another preferred embodiment, the codon recognized by the artificial tRNA is UAG (amber), UAA (ochre), or UGA (opal), and preferably an amber codon.

In another preferred embodiment, the mutant protein specifically catalyzes the artificial tRNA to form an "artificial tRNA-Xa" complex, wherein Xa is the predetermined modified amino acid in aminoacyl form.

In another preferred embodiment, the host cell is a prokaryotic cell or a eukaryotic cell, and preferably *Escherichia coli*.

In another preferred embodiment, the target protein is selected from the group consisting of: insulin, human insulin precursor protein, insulin lispro precursor protein, insulin glargine precursor protein, parathyroid hormone, corticorelin, calcitonin, bivalirudin, glucagon-like peptide and its derivatives exenatide and liraglutide, somaglutide, ziconotide, sermorelin, somatorelin, secretin, teduglutide, hirudin, growth hormone, growth factor, growth hormone releasing factor, adrenocorticotrophic hormone, release factor, deslorelin, desmopressin, elcatonin, glucagon, leuprorelin, luteinizing hormone-releasing hormone, somatostatin, thyrotropin-releasing hormone, triptorelin, vasoactive intestinal peptide, interferon, parathyroid hormone, BH3 peptide, amyloid peptide, or a fragment of the above peptide, and any combination thereof.

In the fifth aspect of the present invention, it provides an expression system, which comprises:
(a) the mutant protein according to the first aspect of the present invention; and
(b) an artificial tRNA capable of binding to a predetermined modified amino acid in the presence of the mutant protein; and optionally
(c) a first nucleic acid sequence encoding a target protein, wherein the first nucleic acid sequence comprises a codon recognized by the artificial tRNA.

In another preferred embodiment, the first nucleic acid sequence contains a codon recognized by the artificial tRNA at a position for introducing a predetermined modified amino acid.

In another preferred embodiment, the expression system further comprises:
(d) a predetermined modified amino acid.

In another preferred embodiment, the predetermined modified amino acid is a lysine with a modified group.

In another preferred embodiment, the modified amino acid is selected from the group consisting of: alkynyloxycarbonyl lysine derivative, t-butyloxycarboryl-L-lysine (BOC-lysine) derivative, fatty acylated lysine, and combinations thereof.

In another preferred embodiment, the structure of the alkynyloxycarbonyl lysine is shown in Formula I:

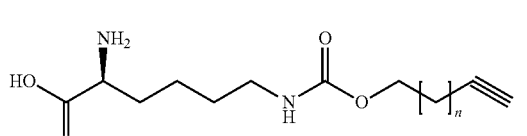

I wherein n is 0-8.

In another preferred embodiment, the artificial tRNA is suppressor tRNA, and preferably amber suppressor tRNA.

In another preferred embodiment, the encoding nucleic acid sequence of the artificial tRNA is shown in SEQ ID NO: 7.

In another preferred embodiment, the codon recognized by the artificial tRNA is UAG (amber), UAA (ochre), or UGA (opal), and preferably an amber codon.

In another preferred embodiment, the expression system is a cell or a cell extract.

In another preferred embodiment, the expression system is used to introduce a predetermined modified amino acid into a target protein or prepare a target protein containing an unnatural amino acid.

In the sixth aspect of the present invention, it provides a plasmid system, which comprises:
(1) a first expression cassette containing a first coding sequence for encoding a target protein, wherein the first coding sequence contains a codon for introducing a predetermined modified amino acid, and the codon is UAG (amber), UAA (ochre), or UGA (opal); and
(2) a second expression cassette containing a second nucleic acid sequence for encoding aminoacyl-tRNA synthetase, wherein the aminoacyl-tRNA synthetase is the mutant protein according to the first aspect of the present invention;
and the system further comprises a third expression cassette, which contains a third coding sequence for encoding an artificial tRNA, wherein the artificial tRNA contains an anticodon corresponding to the codon;
wherein, the aminoacyl-tRNA synthetase specifically catalyzes the artificial tRNA to form an "artificial tRNA-Xa" complex, wherein Xa is the predetermined modified amino acid in aminoacyl form.

In another preferred embodiment, the plasmid system is a single-plasmid system or a multi-plasmid system.

In another preferred embodiment, the multi-plasmid system comprises a double-plasmid system, a three-plasmid system, and a four-plasmid system.

In another preferred embodiment, the codon is UAG (amber) or UGA (opal).

In another preferred embodiment, the codon contains a three-base nucleotide sequence corresponding to an amino acid in mRNA or DNA.

In another preferred embodiment, the predetermined modified amino acid is a lysine with a modified group.

In another preferred embodiment, the modified amino acid is selected from the group consisting of: alkynyloxycarbonyl lysine derivative, t-butyloxycarboryl-L-lysine (BOC-lysine) derivative, fatty acylated lysine, and combinations thereof.

In another preferred embodiment, the first expression cassette, the second expression cassette and the third expression cassette are in different plasmids respectively.

In another preferred embodiment, any two or three of the first expression cassette, the second expression cassette and the third expression cassette are in the same plasmid.

In another preferred embodiment, the plasmid is an expression vector selected from the group consisting of: pBAD/gIII ABC, pBAD/His ABC, pET28a, pETDuet-1, or pEvol-pBpF vector.

In another preferred embodiment, the plasmid further comprises a resistance gene, a tag sequence, a repressor gene (araC), a promoter gene (araBAD), and combinations thereof.

In another preferred embodiment, the resistance gene is selected from the group consisting of: ampicillin resistance gene (AmpR), chloramphenicol resistance gene (CmR), kanamycin resistance gene (KanaR), tetracycline resistance Gene (TetR), and combinations thereof.

In another preferred embodiment, the plasmid system is a double-plasmid system.

In another preferred embodiment, the first expression cassette is in a first plasmid, the second expression cassette is in a second plasmid, and the third expression cassette is in the first plasmid or the second plasmid.

In another preferred embodiment, the third expression cassette is in a second plasmid.

In another preferred embodiment, the first plasmid is an expression vector selected from the group consisting of: pBAD-His ABC, pBAD/His ABC, pET28a, and pETDuet-1.

In another preferred embodiment, the first plasmid further comprises a resistance gene, a tag sequence, a repressor gene (araC), a promoter gene (araBAD), and combinations thereof.

In another preferred embodiment, the second plasmid is a pEvol-pBpF vector.

In another preferred embodiment, the second plasmid further comprises a resistance gene, a tag sequence, a repressor gene (araC), a promoter gene (araBAD), and combinations thereof.

In another preferred embodiment, the positions of the first expression cassette, the second expression cassette and the third expression cassette in the plasmid are not limited in any way.

In another preferred embodiment, any two or three of the first expression cassette, the second expression cassette and the third expression cassette can be combined into one.

In another preferred embodiment, any two of the first expression cassette, the second expression cassette, and the third expression cassette can be connected by a linking sequence (such as IRES, P2A, T2A, etc.).

In another preferred embodiment, the first expression cassette, the second expression cassette, and/or the third expression cassette may or may not comprise a promoter.

In another preferred embodiment, the first expression cassette, the second expression cassette and/or the third expression cassette further comprise one or more promoters, wherein the promoters are operably linked to the first coding sequence, the second coding sequence, the third coding sequence, enhancers, transcription termination signals, polyadenylation sequences, origins of replication, selectable markers, nucleic acid restriction sites, and/or homologous recombination sites.

In another preferred embodiment, the first expression cassette further comprises a first promoter, which is preferably an inducible promoter.

In another preferred embodiment, the first promoter is selected from the group consisting of: arabinose promoter (araBAD), lactose promoter (Plac), pLacUV5 promoter, pTac promoter, and combinations thereof.

In another preferred embodiment, the first expression cassette comprises a promoter (such as araBAD), a ribosome binding site RBS, the first coding sequence, a terminator or a tag sequence in a direction from 5' to 3'.

In another preferred embodiment, the second expression cassette further comprises a second promoter, which is preferably an inducible promoter.

In another preferred embodiment, the second promoter is selected from the group consisting of: arabinose promoter (araBAD), glnS promoter, proK promoter, and combinations thereof.

In another preferred embodiment, the second expression cassette comprises a promoter (such as araBAD or glnS), a ribosome binding site RBS, the second coding sequence, a terminator (rrnB or glnS T) in a direction from 5' to 3'.

In another preferred embodiment, the third expression cassette further comprises a third promoter, which is preferably a constitutive promoter.

In another preferred embodiment, the third promoter is reverse transcription promoter proK.

In another preferred embodiment, the third expression cassette comprises a promoter (such as proK), a ribosome binding site RBS, the third coding sequence, a terminator or a tag sequence in a direction from 5' to 3'.

In the seventh aspect of the present invention, it provides a host cell or a cell extract which contains the expression system according to the fifth aspect of the present invention or the plasmid system according to the sixth aspect of the present invention.

In another preferred embodiment, the host cell is selected from the group consisting of: *Escherichia coli*, *Bacillus subtilis*, a yeast cell, an insect cell, a mammalian cell, and combinations thereof.

In another preferred embodiment, the cell extract is derived from a cell selected from the group consisting of: *Escherichia coli*, *Bacillus subtilis*, a yeast cell, an insect cell, a mammalian cell, and combinations thereof.

In the eighth aspect of the present invention, it provides a method for introducing an unnatural amino acid into a target protein or preparing a target protein containing an unnatural amino acid, which comprises the following steps:
(1) providing the host cell according to the fourth aspect of the present invention or the expression system according to the fifth aspect of the present invention, or the plasmid system according to the sixth aspect of the present invention; and
(2) in the presence of an unnatural amino acid, expressing the target protein by using the host cell, the expression system or the plasmid system.

In another preferred embodiment, the target protein is selected from the group consisting of: human insulin precursor protein, insulin lispro precursor protein, insulin glargine precursor protein, parathyroid hormone, corticorelin, calcitonin, bivalirudin, glucagon-like peptide and its derivatives exenatide and liraglutide, ziconotide, sermorelin, somatorelin, secretin, teduglutide, hirudin, growth hormone, growth factor, growth hormone releasing factor, adrenocorticotrophic hormone, release factor, deslorelin, desmopressin, elcatonin, glucagon, leuprorelin, luteinizing hormone-releasing hormone, somatostatin, thyrotropin-releasing hormone, triptorelin, vasoactive intestinal peptide, interferon, parathyroid hormone, BH3 peptide, amyloid peptide, or a fragment of the above peptide, and any combination thereof.

In another preferred embodiment, the unnatural amino acid is a lysine with a modified group.

In another preferred embodiment, the unnatural amino acid is selected from the group consisting of: alkynyloxycarbonyl lysine derivative, t-butyloxycarboryl-L-lysine (BOC-lysine) derivative, fatty acylated lysine, and combinations thereof.

In another preferred embodiment, the method comprises the steps:
(1) providing a host cell or a cell extract according to the seventh aspect of the present invention; and
(2) culturing the cell or the cell extract in the presence of an unnatural amino acid, thereby introducing the lysine derivative into the target protein through the mutant protein according to the first aspect of the present invention and the artificial tRNA pair.

In the ninth aspect of the present invention, it provides a kit comprising (a) a container, and (b) the mutant protein according to the first aspect of the present invention, or the polynucleotide according to the second aspect of the present invention, or the vector according to the third aspect of the invention, or the expression system according to the fifth aspect of the invention, or the plasmid system according to the sixth aspect of the present invention located in the container.

In another preferred embodiment, the kit further comprises a cell extract.

In another preferred embodiment, the plasmid system is a multi-plasmid system, wherein the respective plasmids are located in the same or different containers.

In the tenth aspect of the present invention, it provides a translation system, which comprises:
(a) the mutant protein according to the first aspect of the present invention;
(b) an artificial tRNA capable of binding to a predetermined modified amino acid in the presence of the mutant protein; and
(c) a predetermined modified amino acid.

In the eleventh aspect of the present invention, it provides use of the mutant protein according to the first aspect of the present invention, or the host cell according to the fourth aspect of the present invention, or the plasmid system according to the sixth aspect of the present invention, or the kit according to the ninth aspect of the present invention for incorporating an unnatural amino acid into a target protein or for preparing a target protein containing an unnatural amino acid.

In the twelfth aspect of the present invention, it provides a method for producing the mutant protein according to the first aspect of the present invention, comprising the steps of:
(i) culturing the host cell according to the fourth aspect of the present invention, thereby expressing the mutant protein.

In the thirteenth aspect of the present invention, it provides an enzyme preparation containing the mutant protein according to the first aspect of the present invention.

In another preferred embodiment, the dosage form of the pharmaceutical preparation comprises: a lyophilized preparation, a liquid preparation, and combinations thereof.

It should be understood that within the scope of the present invention, the above-mentioned technical features of the present invention and the technical features specifically described in the following (such as the embodiments) can be combined with each other to form a new or preferred technical solution, which are not redundantly repeated one by one due to space limitation.

DETAILED DESCRIPTION

Figure 1:
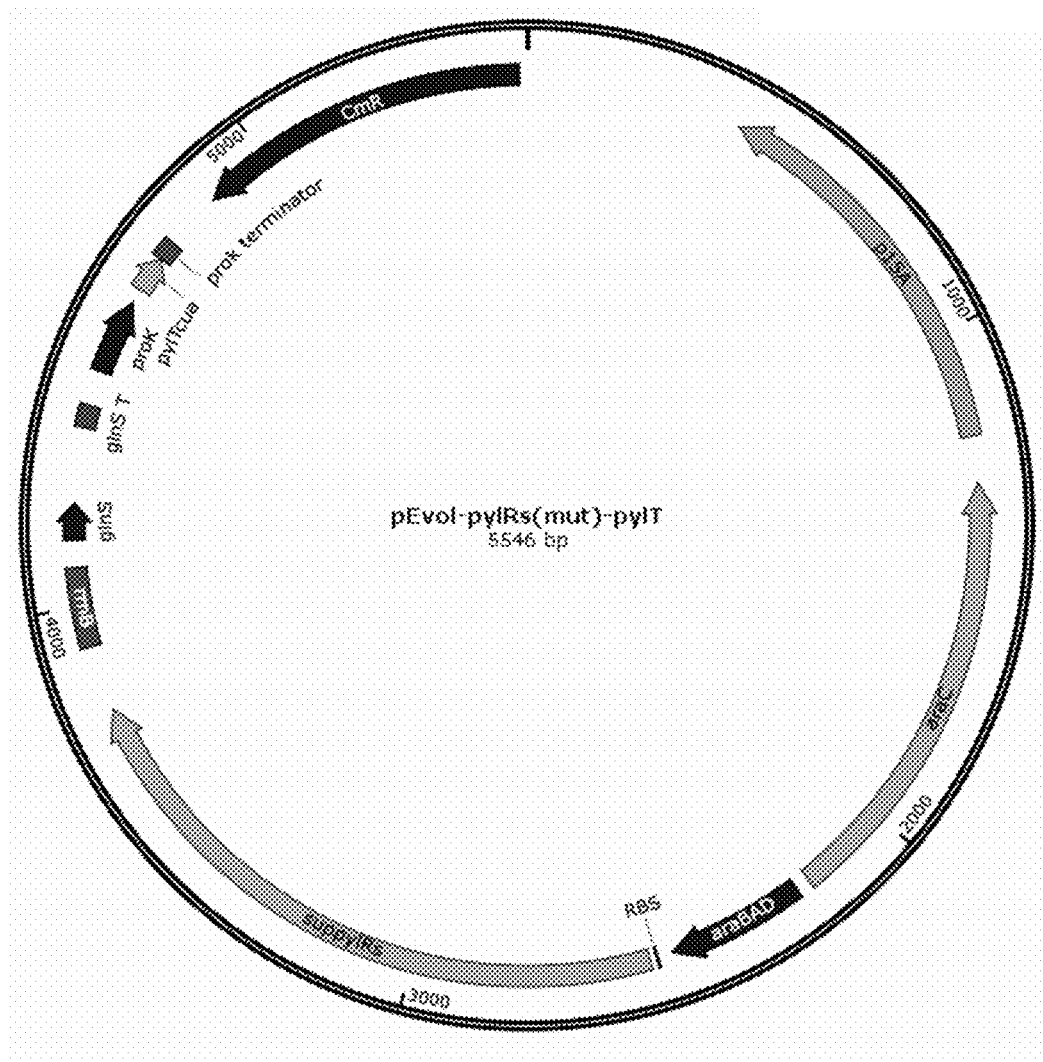
FIG. 1 shows a map of plasmid pEvol-suppylRs-pylT.

After extensive and intensive research and massive screening, the inventors have unexpectedly obtained a mutant lysyl-tRNA synthetase. Compared with the wild-type lysyl-tRNA synthetase, the mutant lysyl-tRNA synthetase of the present invention has high activity, a high level of expression, and good solubility, and can significantly increase the insertion amount of unnatural amino acids and the expression amount of target protein containing unnatural amino acids. In addition, the mutant lysyl-tRNA synthetase of the present invention can also improve the stability of the target protein so that it is not vulnerable to cleavage. On this basis, the inventors have completed the present invention.

Terms

In order to make it easier to understand the present disclosure, certain terms are firstly defined. As used in this application, unless expressly stated otherwise herein, each of the following terms shall have the meaning given below. Other definitions are stated throughout the application.

The term "about" may refer to a value or composition within an acceptable error range of a particular value or composition determined by a person of ordinary skill in the art, which will depend in part on how the value or composition is measured or determined. For example, as used herein, the expression "about 100" includes all values between 99 and 101 (such as 99.1, 99.2, 99.3, 99.4, etc.).

As used herein, the terms "contain" or "comprise (or include)" can be open, semi-closed, and closed. In other words, the terms also include "substantially consisting of" or "consisting of".

Sequence identity (or homology) is determined by comparing two aligned sequences along a predetermined comparison window (it can be 50%, 60%, 70%, 80%, 90%, 95% or 100% of the length of the reference nucleotide sequence or protein) and by determining the number of positions where the same residue appears. Usually, this is expressed as a percentage. The measurement of sequence identity of nucleotide sequences is a method well known to those skilled in the art.

In this article, "aminoacyl-tRNA synthetase" and "lysyl-tRNA synthetase" are used interchangeably.

Wild-Type Lysyl-tRNA Synthetase

As used herein, "wild-type lysyl-tRNA synthetase" refers to a naturally-occurring aminoacyl-tRNA synthetase that has not been artificially modified, and its nucleotides can be obtained through genetic engineering techniques, such as genome sequencing, polymerase chain reaction (PCR), etc., and the amino acid sequence can be deduced from the nucleotide sequence. The source of the wild-type lysyl-tRNA synthetase is not particularly limited. A preferred source comprises but is not limited to *Methanosarcina mazei*, *Methanosarcina barkeri*, and *Methanosarcina acetivorans* of *Methanogenic archaea*.

In a preferred embodiment of the present invention, the amino acid sequence of the wild-type lysyl-tRNA synthetase is shown in SEQ ID NO: 1.

```
                                          (SEQ ID NO: 1)
MDKKPLNTLISATGLWMSRTGTIHKIKHHEVSRSK

IYIEMACGDHLVVNNSRSSRTARALRHHKYRKTCK

RCRVSDEDLNKFLTKANEDQTSVKVKVVSAPTRTK

KAMPKSVARAPKPLENTEAAQAQPSGSKFSPAIPV

STQESVSVPASVSTSISSISTGATASALVKGNTNP

ITSMSAPVQASAPALTKSQTDRLEVLLNPKDEISL

NSGKPFRELESELLSRRKKDLQQIYAEERENYLGK
```

```
                                          -continued
LEREITRFFVDRGFLEIKSPILIPLEYIERMGIDN

DTELSKQIERVDKNECLRPMLAPNLYNYLRKLDRA

LPDPIKIFEIGPCYRKESDGKEHLEEFTMLNFCQM

GSGCTRENLESIITDFLNHLGIDFKIVGDSCMVYG

DTLDVMHGDLELSSAVVGPIPLDREWGIDKPWIGA

GFGLERLLKVKHDFKNIKRAARSESYYNGISTNL
```

In a preferred embodiment of the present invention, the amino acid sequence of the wild-type lysyl-tRNA synthetase is shown in SEQ ID NO: 2.

```
                                          (SEQ ID NO: 2)
MDKKPLNTLISATGLWMSRTGTIHKIKHHEVSRSK

IYIEMACGDHLVVNNSRSSRTARALRHHKYRKTCK

RCRVSDEDLNKFLTKANEDQTSVKVKVVSAPTRTK

KAMPKSVARAPKPLENTEAAQAQPSGSKFSPAIPV

STQESVSVPASVSTSISSISTGATASALVKGNTNP

ITSMSAPVQASAPALTKSQTDRLEVLLNPKDEISL

NSGKPFRELESELLSRRKKDLQQIYAEERENYLGK

LEREITREFVDRGFLEIKSPILIPLEYIERMGIDN

DTELSKQIFRVDKNFCLRPMLAPNLYNYLRKLDRA

LPDPIKIFEIGPCYRKESDGKEHLEEFTMLNFCQM

GSGCTRENLESIITDFLNHLGIDFKIVGDSCMVYG

DTLDVMHGDLELSSAVVGPIPLDREWGIDKPWIGA

GFGLERLLKVKHDFKNIKRAARSGSYYNGISTNL
```

Mutant Lysyl-tRNA Synthetase

As used herein, the terms "mutant protein", "mutant protein of the present invention", "mutant aminoacyl-tRNA synthetase of the present invention", "mutant lysyl-tRNA synthetase", "mutant enzyme", "mutant of aminoacyl-tRNA synthase" can be used interchangeably, and each refers to a non-naturally occurring mutant aminoacyl-tRNA synthetase, and the mutant aminoacyl-tRNA synthetase is a protein artificially modified of the polypeptide as shown in SEQ ID NO: 1 or SEQ ID NO: 2. Specifically, the mutant aminoacyl-tRNA synthetase is as described in the first aspect of the present invention.

It should be understood that the amino acid numbering in the mutant lysyl-tRNA synthetase of the present invention is based on the wild-type lysyl-tRNA synthetase (preferably, SEQ ID NO: 1 or SEQ ID NO: 2). When a specific mutant protein has 80% or more homology with the sequence as shown in SEQ ID NO: 1 or SEQ ID NO: 2, the amino acid number of the mutant protein may be misplaced relative to the amino acid numbering of SEQ ID NO: 1 or SEQ ID NO: 2, such as misalignment of positions 1-5 to the N-terminus or C-terminus of the amino acid. By using conventional sequence alignment techniques in the art, the skilled in the art can generally understand that such a misalignment is within a reasonable range and mutant proteins with the same or similar enzyme activity with 80% or more (such as 90%, 95%, 98%) homology should not be excluded from the scope of the mutant protein of the present invention due to the misplacement of amino acid numbering.

The mutant protein of the present invention is a synthetic protein or a recombinant protein, that is, it can be a chemically synthesized product, or produced from a prokaryotic or eukaryotic host (for example, bacteria, yeast, and plants) using recombinant technology. Depending on the host used in the recombinant production protocol, the mutant protein of the present invention may be glycosylated or non-glycosylated. The mutant protein of the present invention may also include or not include the initial methionine residue.

The present invention also includes fragments, derivatives and analogs of the mutant protein. As used herein, the terms "fragment", "derivative" and "analog" refer to a protein that substantially retains the same biological function or activity as the mutant protein.

The mutant protein fragment, derivative or analogue of the present invention may be (i) a mutant protein in which one or more conservative or non-conservative amino acid residues (preferably conservative amino acid residues) are substituted, and such substituted amino acid residues may or may not be encoded by the genetic codon, or (ii) a mutant protein with a substitution group in one or more amino acid residues, or (iii) a mutant protein formed by fusion of a mature mutant protein with another compound (such as a compound that prolongs the half-life of the mutant protein, such as polyethylene glycol), or (iv) the mutant protein formed by fusion of additional amino acid sequence to this mutant protein sequence (such as leader sequence or secretory sequence or sequence used to purify this mutant protein or proprotein sequence, or fusion protein formed with antigen IgG fragment). According to the teachings herein, these fragments, derivatives and analogs fall within the scope of those skilled in the art. In the present invention, conservatively substituted amino acids are preferably generated by amino acid substitutions according to Table I.

TABLE I

| Initial residues | Representative substitution | Preferred substitution |
| --- | --- | --- |
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val; Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu |

The recognition of the amino acid substrate of PylRS is related to the stereochemical structure of the catalytically active functional domain. The size of lysine derivatives that can be activated by wild-type PylRS is limited, and lysine derivatives with large functional groups cannot be introduced into proteins. Therefore, the effect is improved by mutating the PylRS site so as to avoid the steric hindrance for binding substrate, or the interaction of the mutant amino acid with the substrate amino acid or the main chain part.

Preferably, the mutant protein is shown in any one of SEQ ID NOs: 3-6.

(SEQ ID NO: 3)
MDKKPLNTLISATGLWMSRTGTIHKIKHHEVSRSK

IYIEMACGDHLVVNNSRSSRTARALRHHKYRKTCK

RCRVSDEDLNKFLTKANEDQTSVKVKVVSAPRTKK

AMPKSVARAPKPLENTEAAQASTQESVSVPASVST

SISSSAPVQASAPALTKSQTDRLEVLLNPKDEISL

NSGKPFRELESELLSRRKKDLQQIYAEERENYLGK

LEREITRFFVDRGFLEIKSPILIPLEYIERMGIDN

DTELSKQIFRVDKNFCLRPMLAPNLYNYLRKLDRA

LPDPIKIFEIGPCYRKESDGKEHLEEFTMLNFCQM

GSGCTRENLESIITDFLNHLGIDFKIVGDSCMVYG

DTLDVMHGDLELSSAVVGPIPLDREWGIDKPWIGA

GFGLERLLKVKHDFKNIKRAARSESYYNGISTNL (SEQ ID NO: 4)
MDKKPLDVLISATGLWMSRTGTLHKIKHHEISRSK

IYIEMACGDHLVVNNSRSCRPARAFRYHKYRKTCK

RCRVSDEDINNFLTRSTESKNSVKVRVVSEPKVKK

AMPKSVSRAPKPLENSVSAKASTNTSRSVPSPAKS

TPNSSVPASASAPALTKSQTDRLEVLLNPKDEISL

NSGKPFRELESELLSRRKKDLQQIYAEERENYLGK

LEREITRFFVDRGFLEIKSPILIPLEYIERMGIDN

DTELSKQIFRVDKNFCLRPMLAPNLYNYLRKLDRA

LPDPIKIFEIGPCYRKESDGKEHLEEFTMLNFCQM

GSGCTRENLESIITDFLNHLGIDFKIVGDSCMVFG

DTLDVMHGDLELSSAVVGPIPLDREWGIDKPWIGA

GFGLERLLKVKHDFKNIKRAARSESYYNGISTNL (SEQ ID NO: 5)
MDKKPLDVLISATGLWMSRTGTLHKIKHYEISRSK

IYIEMACGDHLVVNNSRSCRPARAFRYHKYRKTCK

RCRVSGEDINNFLTRSTEGKTSVKVKVVSEPKVKK

AMPKSVSRAPKPLENPVSAKASTDTSRSVPSPAKS

TPNSPVPTSASAPALTKSQTDRLEVLLNPKDEISL

NSGKPFRELESELLSRRKKDLQQIYAEERENYLGK

LEREITRFFVDRGFLEIKSPILIPLEYIERMGIDN

DTELSKQIFRVDKNFCLRPMLAPNLYNYLRKLDRA

LPDPIKIFEIGPCYRKESDGKEHLEEFTMLNFCQM

GSGCTRENLESIITDFLNHLGIDFKIVGDSCMVFG

DTLDVMHGDLELSSAVVGPIPLDREWGIDKPWIGA

GFGLERLLKVKHDFKNIKRAARSESYYNGISTNL

-continued

```
                                              (SEQ ID NO: 6)
MDKKPLDVLISATGLWMSRTGTLHKIKHHEISRSK

IYIEMACGDHLVVNNSRSCRPARAFRYHKYRKTCK

RCRVSDEDINNFLTRSTESKNSVKVRVVSEPKVKK

AMPKSVSRAPKPLENSVSAKASTNTSRSVPSPAKS

TPNSSVPASASAPALTKSQTDRLEVLLNPKDEISL

NSGKPFRELESELLSRRKKDLQQIYAEERENYLGK

LEREITRFFVDRGFLEIKSPILIPLEYIERMGIDN

DTELSKQIFRVDKNFCLRPMLAPNLYNYARKLDRA

LPDPIKIFEIGPCYRKESDGKEHLEEFTMLNFSQM

GSGCTRENLESIITDFLNHLGIDFKIVGDSCMVYG

DTLDVMHGDLELSSAVVGPIPLDREWGIDKPWIGA

GFGLERLLKVKHDFKNIKRAARSESYYNGISTNL
```

It should be understood that, compared with the sequence as shown in SEQ ID NO: 1 or SEQ ID NO: 2, the mutant protein of the present invention generally has high homology (or identity). Preferably, the homology between the mutant protein and the peptide fragment of corresponding length present in SEQ ID NO. 1 or 2 is at least 90%, 95%, 96%, 97%, 98%, or 99%.

In addition, the mutant protein of the present invention can also be modified. Modification (usually not changing the primary structure) includes: chemically derived forms of the mutant protein in vivo or in vitro, such as acetylation or carboxylation. Modifications also include glycosylation, such as those produced by glycosylation modification during the synthesis and processing of the mutant protein or during further processing steps. This modification can be accomplished by exposing the mutant protein to an enzyme that performs glycosylation (such as a mammalian glycosylase or deglycosylase). Modification also includes sequences having phosphorylated amino acid residues (such as phosphotyrosine, phosphoserine, phosphothreonine). It also includes mutant proteins that have been modified to increase their resistance to proteolysis or to optimize their solubility.

The term "polynucleotide encoding the mutant protein of the present invention" may include the polynucleotide encoding the mutant lysyl-tRNA synthetase of the present invention, or may also be a polynucleotide that also includes additional coding and/or non-coding sequences.

The present invention also relates to variants of the above polynucleotides, which encode fragments, analogs and derivatives of polypeptides or mutant proteins having the same amino acid sequence as the present invention. These nucleotide variants include substitution variants, deletion variants and insertion variants. As is known in the art, an allelic variant is an alternative form of a polynucleotide. It may be substitution, deletion or insertion of one or more nucleotides, but it will not substantially change the function of the mutant protein it encodes.

The present invention also relates to polynucleotides that hybridize with the aforementioned sequences and have at least 50%, preferably at least 70%, and more preferably at least 80% identity between the two sequences. The present invention particularly relates to polynucleotides that can hybridize with the polynucleotide of the present invention under strict condition (or stringent condition). In the present invention, "strict condition" refers to: (1) hybridization and elution at lower ionic strength and higher temperature, such as 0.2×SSC, 0.1% SDS, 60° C.; or (2) adding denaturant during hybridization, such as 50% (v/v) formamide, 0.1% calf serum/0.1% Ficoll, 42° C., etc.; or (3) hybridization occurs only when the identity between the two sequences is at least 90% or more, and more preferably 95% or more.

The mutant protein and polynucleotide of the present invention are preferably provided in an isolated form, and more preferably, are purified to homogeneity.

The full-length sequence of the polynucleotide of the present invention can usually be obtained by PCR amplification method, recombination method or artificial synthesis method. For the PCR amplification method, primers can be designed according to the relevant nucleotide sequence disclosed in the present invention, especially the open reading frame sequence, and using a commercially available cDNA library or a cDNA library prepared according to a conventional method known to those skilled in the art as a template to amplify the relevant sequence. When the sequence is long, it is often necessary to perform two or more PCR amplifications, and then amplified fragments produced each time are linked together in the correct order.

Once the relevant sequence is obtained, the recombination method can be used to obtain the relevant sequence in large quantities. This is usually done by cloning it into a vector, then transferring it into a cell, and isolating the relevant sequence from the proliferated host cell by conventional methods.

In addition, artificial synthesis methods can also be used to synthesize related sequences, especially when the fragment length is short. Usually, fragments with very long sequences can be obtained by first synthesizing multiple small fragments and then ligating them.

At present, the DNA sequence encoding the protein (or fragment or derivative thereof) of the present invention can be obtained completely through chemical synthesis. The DNA sequence can then be introduced into various existing DNA molecules (or such as vectors) and cells known in the art. In addition, mutations can also be introduced into the protein sequence of the present invention through chemical synthesis.

The method of using PCR technology to amplify DNA/RNA is preferably used to obtain the polynucleotide of the present invention. Especially when it is difficult to obtain full-length cDNA from the library, the RACE method (RACE-cDNA end rapid amplification method) can be preferably used, and the primers used for PCR can be appropriately selected according to the sequence information of the present invention disclosed herein, and can be synthesized by conventional methods. The amplified DNA/RNA fragments can be separated and purified by conventional methods such as gel electrophoresis.

Expression Vector

As used herein, the term "construct" or "vector" generally refers to a nucleic acid capable of transporting the coding sequence of the target protein to which it is attached. One type of the vector is a "plasmid", which refers to a circular double-stranded DNA loop that can connect additional DNA segments.

The vector can be transformed or transfected into a suitable host cell to provide protein expression. This process may include culturing the host cell transformed with the expression vector under conditions that provide the expression of the vector encoding the target nucleic acid sequence of the protein, and optionally recovering the expressed protein.

The vector may be, for example, a plasmid or viral vector which provides an origin of replication, optionally a promoter used to express the target nucleic acid sequence, and optionally a regulator of the promoter. In the case of bacterial plasmids, the vector may include one or more selectable marker genes, such as kanamycin resistance genes.

The present invention also relates to a vector containing the polynucleotide of the present invention, a host cell produced by genetic engineering using the vector of the present invention or the mutant protein coding sequence of the present invention, and a method for producing the polypeptide of the present invention via recombinant technology.

By using conventional recombinant DNA technology, the polynucleotide sequence of the present invention can be used to express or produce recombinant mutant protein. Generally, there are the following steps:
(1) using the polynucleotide (or variant) of the present invention encoding the mutant protein of the present invention, or using a recombinant expression vector containing the polynucleotide to transform or transfect a suitable host cell;
(2) culturing the host cell in a suitable medium;
(3) separating and purifying the protein from the culture medium or cells.

In the present invention, the polynucleotide sequence encoding the mutant protein can be inserted into a recombinant expression vector. The term "recombinant expression vector" refers to bacterial plasmids, bacteriophages, yeast plasmids, plant cell viruses, mammalian cell viruses such as adenovirus, retrovirus or other vectors well known in the art. Any plasmid and vector can be used as long as it can be replicated and stabilized in the host. An important feature of an expression vector is that it usually includes an origin of replication, a promoter, a marker gene, and translation control elements.

Methods well known to those skilled in the art can be used to construct an expression vector which contains the DNA sequence encoding the mutant protein of the present invention and appropriate transcription/translation control signals. These methods include in vitro recombinant DNA technology, DNA synthesis technology, and in vivo recombination technology. The DNA sequence can be effectively linked to an appropriate promoter in the expression vector to guide mRNA synthesis. Representative examples of these promoters comprise: *Escherichia coli* lac or trp promoter; lambda phage PL promoter; eukaryotic promoters including CMV immediate early promoter, HSV thymidine kinase promoter, early and late SV40 promoter, retroviral LTRs and some other known promoters that can control gene expression in prokaryotic or eukaryotic cells or viruses. The expression vector also includes a ribosome binding site for translation initiation and a transcription terminator.

In addition, the expression vector preferably contains one or more selectable marker genes to provide phenotypic traits for selecting transformed host cells, such as dihydrofolate reductase, neomycin resistance, and green fluorescent protein (GFP) for eukaryotic cell culture, or tetracycline or ampicillin resistance for *Escherichia coli*.

A vector containing the above-mentioned appropriate DNA sequence and an appropriate promoter or a control sequence can be used to transform an appropriate host cell so that it can express the protein.

The host cell can be a prokaryotic cell, such as a bacterial cell; or a lower eukaryotic cell, such as a yeast cell; or a higher eukaryotic cell, such as a mammalian cell. Representative examples comprise: *Escherichia coli, Streptomyces*; bacterial cells of *Salmonella typhimurium*; fungal cells such as yeast and plant cells (such as ginseng cells).

When the polynucleotide of the present invention is expressed in higher eukaryotic cells, if an enhancer sequence is inserted into the vector, the transcription will be enhanced. Enhancers are cis-acting factors of DNA, usually about 10 to 300 base pairs, acting on promoters to enhance gene transcription. Examples include the 100 to 270 base pairs of the SV40 enhancer on the late side of the replication initiation point, the polyoma enhancer on the late side of the replication initiation point, and adenovirus enhancers and the like.

Those of ordinary skill in the art know how to select appropriate vectors, promoters, enhancers and host cells.

Transformation of host cells with recombinant DNA can be carried out by conventional techniques well known to those skilled in the art. When the host is a prokaryote such as *Escherichia coli*, competent cells that can absorb DNA can be harvested after the exponential growth phase and treated with the $CaCl_2$) method. The steps used are well known in the art. Another method is to use $MgCl_2$. If necessary, transformation can also be carried out by electroporation. When the host is a eukaryote, the following DNA transfection methods can be selected: calcium phosphate co-precipitation method, conventional mechanical methods such as microinjection, electroporation, liposome packaging, etc.

The obtained transformants can be cultured by conventional methods to express the polypeptide encoded by the gene of the present invention. Depending on the host cell used, the medium used in the culture can be selected from various conventional mediums. The culture is carried out under conditions suitable for the growth of the host cell. After the host cells have grown to an appropriate cell density, the selected promoter is induced by a suitable method (such as temperature conversion or chemical induction), and the cells are cultured for a period of time.

The recombinant polypeptide in the above method can be expressed in the cell or on the cell membrane, or secreted out of the cell. If necessary, using its physical, chemical and other characteristics to separate and purify the recombinant protein by using various separation methods. These methods are well known to those skilled in the art. Examples of these methods include, but are not limited to: conventional renaturation treatment, treatment with protein precipitation agent (salting out method), centrifugation, breaking bacteria via osmosis, ultra-treatment, ultra-centrifugation, molecular sieve chromatography (gel filtration), adsorption chromatography, ion exchange chromatography, high performance liquid chromatography (HPLC) and various other liquid chromatography techniques and combinations thereof.

The term "operably linked" refers to linking the target gene to be transcribed and expressed to its regulatory sequence by conventional methods in the art so as to express the target gene.

Plasmid System

The present invention provides a plasmid system, as described in the sixth aspect of the present invention. Specifically, the plasmid system comprises:
(1) a first expression cassette containing a first coding sequence for encoding a target protein, wherein the first coding sequence contains a codon for introducing a predetermined modified amino acid, and the codon is UAG (amber), UAA (ochre), or UGA (opal); and
(2) a second expression cassette containing a second nucleic acid sequence for encoding aminoacyl-tRNA synthetase, wherein the aminoacyl-tRNA synthetase is the mutant protein according to the first aspect of the present invention;

and the system further comprises a third expression cassette, which contains a third coding sequence for encoding an artificial tRNA, wherein the artificial tRNA contains an anticodon corresponding to the codon;

wherein, the aminoacyl-tRNA synthetase specifically catalyzes the artificial tRNA to form an "artificial tRNA-Xa" complex, wherein Xa is the predetermined modified amino acid in aminoacyl form.

In another preferred embodiment, the plasmid system is a single-plasmid system or a multi-plasmid system.

In another preferred embodiment, the multi-plasmid system includes a double-plasmid system, a three-plasmid system, and a four-plasmid system.

In another preferred embodiment, the first expression cassette, the second expression cassette and the third expression cassette are in different plasmids respectively.

In another preferred embodiment, any two or three of the first expression cassette, the second expression cassette and the third expression cassette are in the same plasmid.

In another preferred embodiment, the plasmid is an expression vector selected from the group consisting of: pBAD/gIII ABC, pBAD/His ABC, pET28a, pETDuet-1, or pEvol-pBpF vector.

In another preferred embodiment, the plasmid further comprises a resistance gene, a tag sequence, a repressor gene (araC), a promoter gene (araBAD), and combinations thereof.

In another preferred embodiment, the resistance gene is selected from the group consisting of: ampicillin resistance gene (AmpR), chloramphenicol resistance gene (CmR), kanamycin resistance gene (KanaR), tetracycline resistance Gene (TetR), and combinations thereof.

In another preferred embodiment, the DNA sequence of the promoter glnS is as shown in SEQ ID NO: 10.

```
                                        (SEQ ID NO: 10)
TTTTAAAAAACTAACAGTTGTCAGCCTGTCCCGCT

TTAATATCATACGCCGTTATACGTTGTTTACGCTT

TG
```

In another preferred embodiment, the DNA sequence of the terminator glnS T is as shown in SEQ ID NO: 11.

```
                                        (SEQ ID NO: 11)
CAAACAATCCAAAACGCCGCGTTCAGCGGCGTTTT

TTCTGCTTTT
```

In another preferred embodiment, the DNA sequence of the promoter proK is as shown in SEQ ID NO: 12.

```
                                        (SEQ ID NO: 12)
TGTGCTTCTCAAATGCCTGAGGCCAGTTTGCTCAG

GCTCTCCCCGTGGAGGTAATAATTGACGATATGAT

CAGTGCACGGCTAACTAAGCGGCCTGCTGACTTTC

TCGCCGATCAAAAGGCATTTTGCTATTAAGGGATT

GACGAGGGCGT
```

In another preferred embodiment, the DNA sequence of the terminator proK T is shown in SEQ ID NO: 13.

```
                                        (SEQ ID NO: 13)
AATTCGAAAAGCCTGCTCAACGAGCAGGCTTTTTT

GCATG
```

Compared with the Prior Art, the Present Invention Mainly has the Following Advantages:

After a large number of screenings and modifications, it is first discovered in the present invention that the truncated mutant aminoacyl-tRNA synthetase (such as SEQ ID NO: 3) obtained by deleting the amino acid residues at position 102, positions 128-140, and positions 159-179 corresponding to wild-type aminoacyl-tRNA synthetase (such as SEQ ID NO: 1 or 2) can not only introduce lysine derivatives with large functional groups into proteins, but also significantly increase the enzyme activity, and has a high level of expression and good solubility. It can significantly increase the insertion amount of unnatural amino acids and the expression amount of target protein containing unnatural amino acids.

Additionally, the mutant lysyl-tRNA synthetase of the present invention can also improve the stability of the target protein so that it does not easily break.

It is also found in the present invention that the mutant protein (such as SEQ ID NOs: 4-6) obtained by mutating at other positions of the truncated mutant aminoacyl-tRNA synthetase can further increase the insertion amount of unnatural amino acids, the amount of target protein containing unnatural amino acids and/or the stability of the target protein.

The present invention will be further illustrated below with reference to the specific examples. It should be understood that these examples are only to illustrate the invention, not to limit the scope of the invention. The experimental methods with no specific conditions described in the following examples are generally performed under the conventional conditions (e.g., the conditions described by Sambrook et al., Molecular Cloning: Laboratory Guide (New York: Cold Spring Harbor Laboratory Press, 1989), or according to the manufacture's instructions. Unless indicated otherwise, all percentage and parts are calculated by weight.

Unless otherwise stated, the experimental materials and reagents used in the following examples are commercially available.

Example 1 Construction of Mutants

According to the amino acid sequence 1 (SEQ ID NO: 1) of the wild-type lysyl-tRNA synthetase pylRs and the codon preference of *Escherichia coli*, the DNA sequence of pylRs (SEQ ID NO: 8) was synthesized and cloned into the SpeI-SalI site at downstream of the araBAD promoter of the expression vector plasmid pEvol-pBpF (purchased from NTCC company, chloramphenicol resistance). The SpeI restriction site was increased by PCR, and the SalI site was inherent in the vector. The original glutamine promoter glnS of the expression vector plasmid pEvol-pBpF was retained. At downstream of the proK promoter of the expression vector plasmid pEvol-pBpF, the DNA sequence (SEQ ID NO: 7) of the unnatural tRNA (pylT) was inserted by PCR.

(SEQ ID NO: 7)
GGAAACCTGATCATGTAGATCGAATGGACTCTAAA

TCCGTTCAGCCGGGTTAGATTCCCGGGGTTTCCGC

CA

DNA Sequence of pylRs (SEQ ID NO: 8), 1365 bp (SEQ ID NO: 8)
ATGGATAAGAAACCGCTGAATACTCTGATTTCTGC

AACTGGTCTGTGGATGAGCCGTACCGGCACCATCC

ACAAGATCAAACACCACGAGGTTTCCCGTAGCAAA

ATCTACATCGAAATGGCGTGCGGTGACCACCTGGT

GGTAAACAACTCCCGTTCTTCTCGTACTGCACGTG

CTCTGCGCCACCACAAGTACCGTAAGACCTGCAAG

CGCTGTCGCGTGTCTGATGAAGACCTGAACAAATT

CCTGACTAAAGCGAACGAAGATCAGACTTCTGTGA

AGGTGAAAGTTGTTTCTGCCCCAACCCGCACCAAG

AAAGCGATGCCGAAGTCCGTTGCACGCGCTCCGAA

ACCGCTGGAGAACACCGAAGCCGCACAGGCCCAGC

CGTCTGGTTCTAAGTTTTCTCCGGCAATCCCGGTT

TCTACTCAGGAGTCTGTGTCTGTGCCAGCTTCTGT

TAGCACTTCTATTTCCTCTATCAGCACTGGTGCGA

CTGCGTCCGCTCTGGTAAAAGGTAACACTAACCCG

ATCACCAGCATGTCTGCTCCGGTTCAGGCTTCTGC

ACCGGCACTGACTAAAAGCCAGACTGACCGTCTGG

AGGTTCTGCTGAACCCGAAAGATGAAATCAGCCTG

AACTCTGGCAAACCGTTCCGTGAACTGGAATCCGA

ACTGCTGTCTCGTCGTAAGAAAGACCTGCAACAAA

TCTATGCTGAAGAGCGTGAAAACTACCTGGGTAAA

CTGGAACGTGAAATCACCCGTTTCTTTGTGGACCG

TGGTTTCCTGGAAATCAAGTCTCCGATCCTGATCC

CGCTGGAATACATCGAGCGCATGGGTATTGATAAC

GACACCGAACTGTCCAAGCAGATTTTCCGTGTGGA

CAAGAACTTCTGCCTGCGTCCGATGCTGGCACCGA

ACCTGTACAATTACCTGCGTAAACTGGATCGTGCA

CTGCCGGACCCGATCAAAATCTTTGAAATCGGTCC

ATGCTATCGTAAGGAGAGCGACGGTAAAGAACACC

TGGAAGAGTTCACTATGCTGAACTTTTGTCAGATG

GGTTCTGGCTGCACCCGTGAAAATCTGGAATCTAT

CATCACCGACTTCCTGAACCACCTGGGCATTGACT

TCAAAATCGTTGGTGATTCCTGCATGGTTTACGGT

GACACTCTGGACGTTATGCATGGTGATCTGGAACT

GAGCAGCGCTGTTGTGGGTCCGATTCCGCTGGATC

GTGAATGGGGTATCGATAAACCGTGGATTGGTGCT

GGCTTCGGTCTGGAACGTCTGCTGAAAGTTAAGCA

CGACTTTAAGAACATCAAACGTGCTGCGCGTTCCG

AGTCCTATTACAACGGCATTAGCACTAACCTGTAA

The sequence was cut from the cloning vector with restriction enzymes SpeI and SalI, while plasmid pEvol-pylRs-pylT was cut with SpeI and SalI (the target DNA fragment was a large fragment of 4.3 kb). Then the products were separated by nucleic acid electrophoresis, extracted with agarose gel DNA recovery kit, ligated with T4 DNA Ligase, and transformed into large E. coli Top10 competent cells by chemical method ($CaCl_2$) method). The transformed cells were cultured on LB agar medium (10 g/L yeast peptone, 5 g/L yeast extract powder, 10 g/L NaCl, 1.5% agar) containing chloramphenicol at 37° C. overnight. A single live colony was picked and cultured in liquid LB medium (10 g/L yeast peptone, 5 g/L yeast extract powder, 10 g/L NaCl) containing chloramphenicol at 37° C. at 220 rpm overnight. The plasmid was extracted with a Plasmid Mini Extraction Kit, and the obtained plasmid was named pEvol-pylRs-pylT.

According to the amino acid sequence (SEQ ID NO: 1) of wild-type lysyl-tRNA synthetase pylRs, 3 original sequences (i.e., 102T, 128Q-140V, and 159I-179M; 35 amino acids in total) were knocked out to obtain the amino acid sequence (SEQ ID NO: 3) of synthetase suppylRs. The plasmid was named pEvol-suppylRs-pylT, and the map of the plasmid is shown in FIG. 1.

Figure 2:
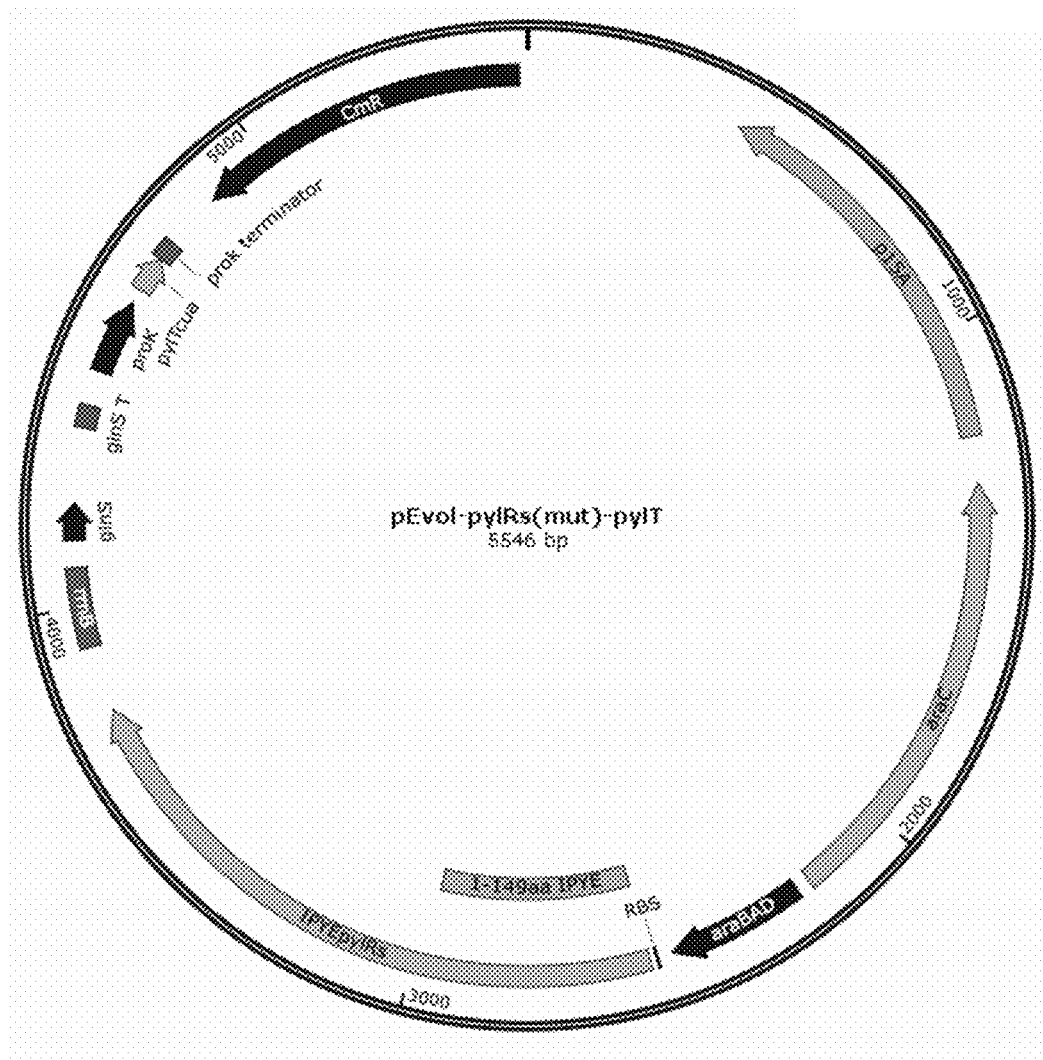
FIG. 2 shows a map of plasmid pEvol-IPYEpylRs-pylT.

According to the amino acid sequence (SEQ ID NO: 1) of wild-type lysyl-tRNA synthetase pylRs, the entire segment of amino acids at positions 1-184 was replaced with another segment of 149 amino acids, wherein the 3 amino acid sequences (i.e., 102T, 128Q-140V, and 159I-179M; 35 amino acids in total) corresponding to the wild-type lysyl-tRNA synthetase pylRs were also knocked out as in the plasmid pEvol-suppylRs-pylT. The amino acid sequence (SEQ ID NO: 4) of synthetase IPYEpylRs was obtained, and the DNA sequence (SEQ ID NO: 9) of IPYEpylRs was synthesized according to the codon preference of Escherichia coli. The plasmid was named pEvol-IPYEpylRs-pylT, and the map of the plasmid is shown in FIG. 2.

DNA Sequence of IPYEpylRs (SEQ ID NO: 9), 1260 bp (SEQ ID NO: 9)
ATGGATAAGAAGCCACTGGATGTTCTGATTTCCGC

TACTGGTCTGTGGATGTCTCGCACTGGTACTCTGC

ACAAGATCAAACACCACGAAATCTCTCGCTCCAAG

ATCTACATTGAAATGGCTTGTGGTGATCACCTGGT

TGTTAACAACTCCCGCTCTTGTCGCCCGGCTCGTG

CGTTTCGCTATCACAAATATCGTAAACCTGCAAA

CGCTGCCGCGTGAGCGATGAGGATATTAACAACTT

CCTGACTCGCTCCACCGAGAGCAAGAACTCTGTGA

AAGTTCGCGTAGTTTCTGAACCGAAAGTTAAGAA

GCTATGCCGAAGTCTGTTAGCCGTGCTCCGAAACC

GCTGGAGAACTCTGTGTCCGCGAAAGCGAGCACCA

-continued

```
ACACCAGCCGTTCTGTTCCGTCTCCAGCGAAATCT
ACTCCGAACTCTAGCGTGCCAGCTTCCGCTTCTGC
ACCGGCACTGACTAAAAGCCAGACTGACCGTCTGG
AGGTTCTGCTGAACCCGAAAGATGAAATCAGCCTG
AACTCTGGCAAACCGTTCCGTGAACTGGAATCCGA
ACTGCTGTCTCGTCGTAAGAAAGACCTGCAACAAA
TCTATGCTGAAGAGCGTGAAAACTACCTGGGTAAA
CTGGAACGTGAAATCACCCGTTTCTTTGTGGACCG
TGGTTTCCTGGAAATCAAGTCTCCGATCCTGATCC
CGCTGGAATACATCGAGCGCATGGGTATTGATAAC
GACACCGAACTGTCCAAGCAGATTTTCCGTGTGGA
CAAGAACTTCTGCCTGCGTCCGATGCTGGCACCGA
ACCTGTACAATTACCTGCGTAAACTGGATCGTGCA
CTGCCGGACCCGATCAAAATCTTTGAAATCGGTCC
ATGCTATCGTAAGGAGAGCGACGGTAAAGAACACC
TGGAAGAGTTCACTATGCTGAACTTTTGTCAGATG
GGTTCTGGCTGCACCCGTGAAAATCTGGAATCTAT
CATCACCGACTTCCTGAACCACCTGGGCATTGACT
TCAAAATCGTTGGTGATTCCTGCATGGTTTTCGGT
GACACTCTGGACGTTATGCATGGTGATCTGGAACT
GAGCAGCGCTGTTGTGGGTCCGATTCCGCTGGATC
GTGAATGGGGTATCGATAAACCGTGGATTGGTGCT
GGCTTCGGTCTGGAACGTCTGCTGAAAGTTAAGCA
CGACTTTAAGAACATCAAACGTGCTGCGCGTTCCG
AGTCCTATTACAACGGCATTAGCACTAACCTGTAA
```

Figure 3:
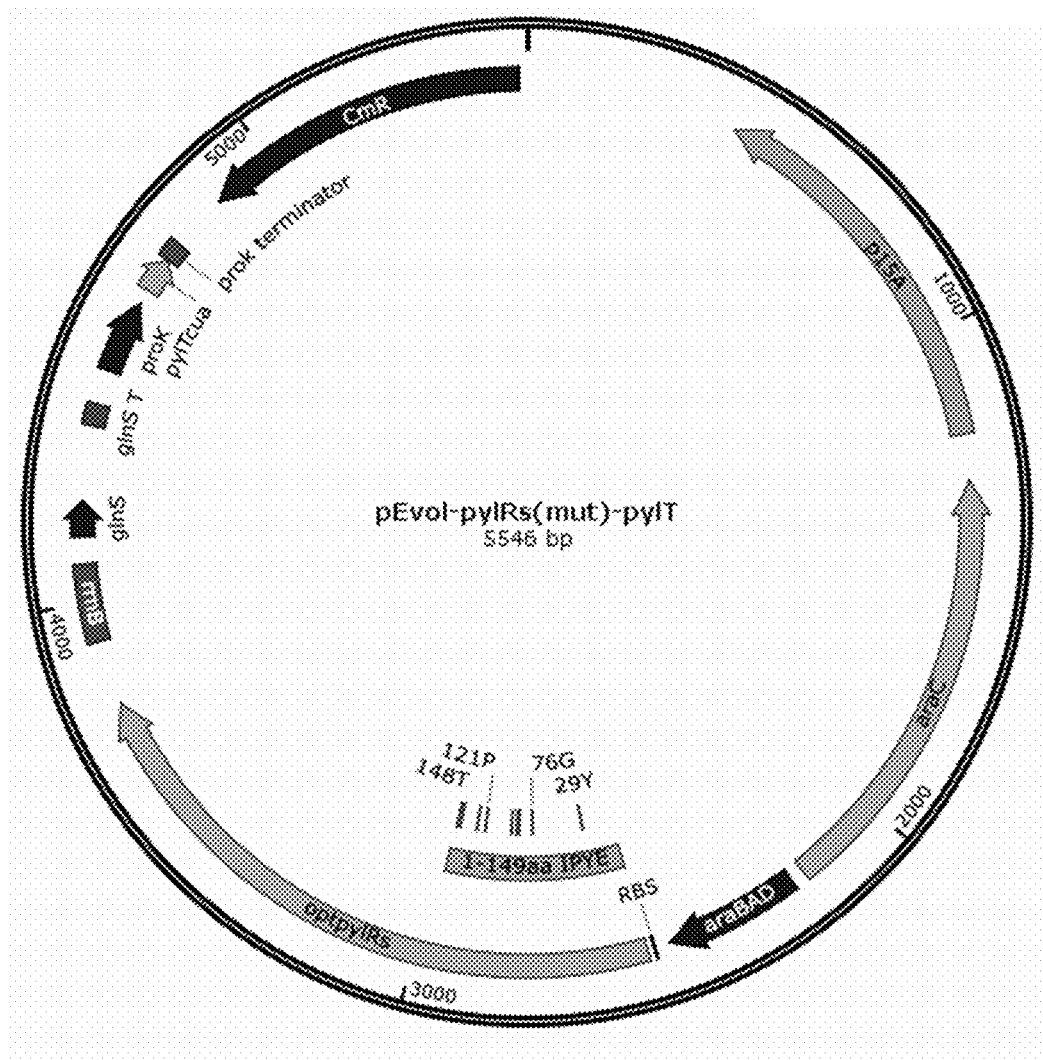
FIG. 3 shows a map of plasmid pEvol-optpylRs-pylT.

According to the amino acid sequence (SEQ ID NO: 4) of wild-type lysyl-tRNA synthetase IPYEpylRs, H29Y, D76G, D89G, N91T, R96K, D121P, N129D, S145P, and A148T mutations were introduced to obtain the mutant lysyl-tRNA synthetase optpylRs with the amino acid sequence as shown in SEQ ID NO: 5. The plasmid was named pEvol-optpylRs-pylT, and the map of the plasmid is shown in FIG. 3.

Figure 4:
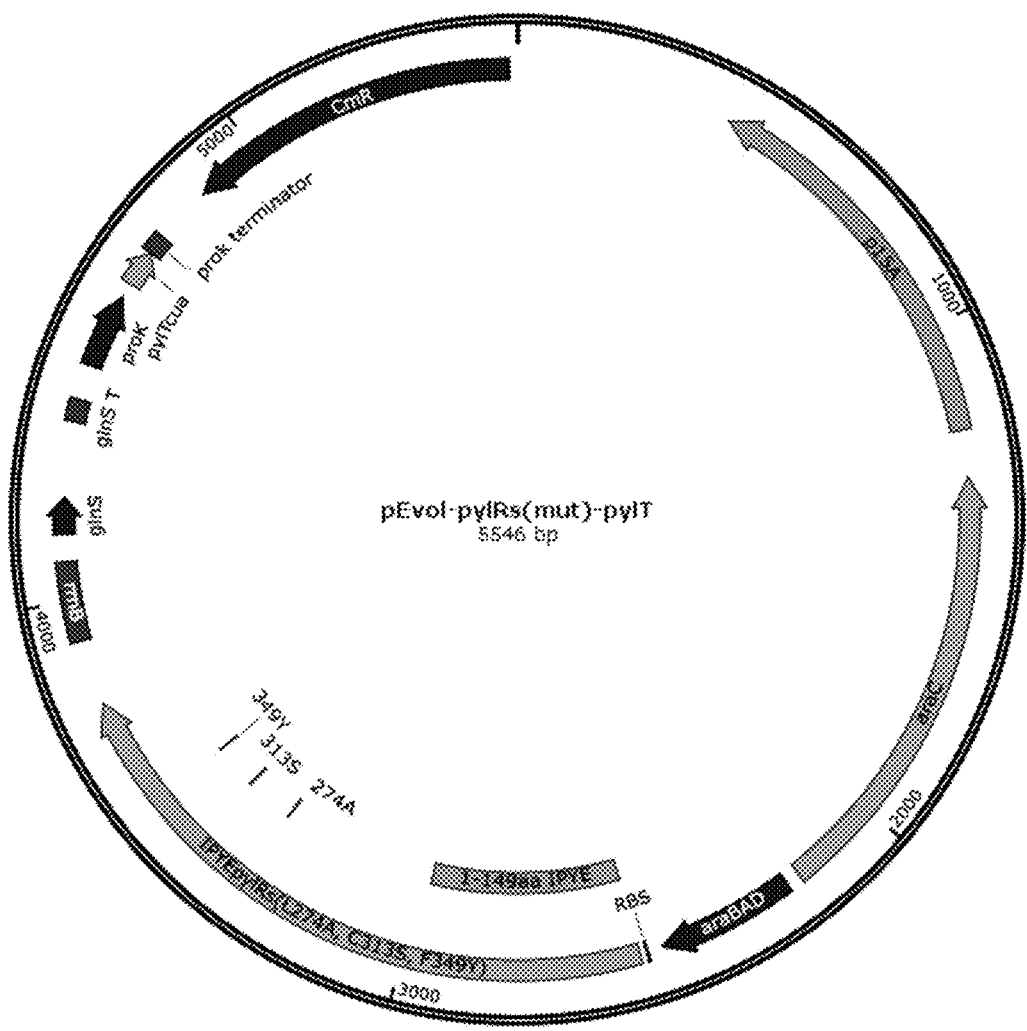
FIG. 4 shows a map of plasmid pEvol-IPYEpylRs (L274A, C313 S, F349Y)-pylT.

According to the amino acid sequence (SEQ ID NO: 4) of wild-type lysyl-tRNA synthetase IPYEpylRs, L274A, C313S, and F349Y mutations were introduced, thereby obtaining the mutant lysyl-tRNA synthetase IPYEpylRs (L274A, C313S, F349Y) with the amino acid sequence as shown in SEQ ID NO: 6. The plasmid was named pEvol-IPYEpylRs (L274A, C313S, F349Y)-pylT, and the map of the plasmid is shown in FIG. 4.

Example 2 Expression Strain Construction of Single-Plasmid Mutant

According to the amino acid sequence (SEQ ID NO: 4) of wild-type lysyl-tRNA synthetase IPYEpylRs, according to the DNA sequence (SEQ ID NO: 7) of unnatural tRNA (pylT), according to the DNA sequences (SEQ ID NOs: 10-13) of the glutamine promoter glnS and promoter proK derived from the pEvol-pBpF vector and their corresponding terminator, and according to the codon preference of Escherichia coli, the DNA sequence (SEQ ID NO: 14) of glnS [pylRs]-proK [pylT] was synthesized and cloned into the AvrII-XbaI site at downstream of the rrnB terminator of the plasmid pBAD-A1-u4-u5-TEV-R-MiniINS (the plasmid constructed by our company, kanamycin resistance), wherein the AvrII and XbaI restriction sites were introduced by PCR.

DNA Sequence of glnS [pylRs]-proK [pylT]: (SEQ ID NO: 14)

(SEQ ID NO: 14)
```
TTTTAAAAAACTAACAGTTGTCAGCCTGTCCCGCT
TTAATATCATACGCCGTTATACGTTGTTTACGCTT
TGAGGAATCCCATATGGATAAGAAACCGCTGAATA
CTCTGATTTCTGCAACTGGTCTGTGGATGAGCCGT
ACCGGCACCATCCACAAGATCAAACACCACGAGGT
TTCCCGTAGCAAAATCTACATCGAAATGGCGTGCG
GTGACCACCTGGTGGTAAACAACTCCCGTTCTTCT
CGTACTGCACGTGCTCTGCGCCACCACAAGTACCG
TAAGACCTGCAAGCGCTGTCGCGTGTCTGATGAAG
ACCTGAACAAATTCCTGACTAAAGCGAACGAAGAT
CAGACTTCTGTGAAGGTGAAAGTTGTTTCTGCCCC
AACCCGCACCAAGAAAGCGATGCCGAAGTCCGTTG
CACGCGCTCCGAAACCGCTGGAGAACACCGAAGCC
GCACAGGCCCAGCCGTCTGGTTCTAAGTTTTCTCC
GGCAATCCCGGTTTCTACTCAGGAGTCTGTGTCTG
TGCCAGCTTCTGTTAGCACTTCTATTTCCTCTATC
AGCACTGGTGCGACTGCGTCCGCTCTGGTAAAAGG
TAACACTAACCCGATCACCAGCATGTCTGCTCCGG
TTCAGGCTTCTGCACCGGCACTGACTAAAAGCCAG
ACTGACCGTCTGGAGGTTCTGCTGAACCCGAAAGA
TGAAATCAGCCTGAACTCTGGCAAACCGTTCCGTG
AACTGGAATCCGAACTGCTGTCTCGTCGTAAGAAA
GACCTGCAACAAATCTATGCTGAAGAGCGTGAAAA
CTACCTGGGTAAACTGGAACGTGAAATCACCCGTT
TCTTTGTGGACCGTGGTTTCCTGGAAATCAAGTCT
CCGATCCTGATCCCGCTGGAATACATCGAGCGCAT
GGGTATTGATAACGACACCGAACTGTCCAAGCAGA
TTTTCCGTGTGGACAAGAACTTCTGCCTGCGTCCG
ATGCTGGCACCGAACCTGTACAATTACCTGCGTAA
ACTGGATCGTGCACTGCCGGACCCGATCAAAATCT
TTGAAATCGGTCCATGCTATCGTAAGGAGAGCGAC
GGTAAAGAACACCTGGAAGAGTTCACTATGCTGAA
CTTTTGTCAGATGGGTTCTGGCTGCACCCGTGAAA
```

-continued

```
ATCTGGAATCTATCATCACCGACTTCCTGAACCAC

CTGGGCATTGACTTCAAAATCGTTGGTGATTCCTG

CATGGTTTACGGTGACACTCTGGACGTTATGCATG

GTGATCTGGAACTGAGCAGCGCTGTTGTGGGTCCG

ATTCCGCTGGATCGTGAATGGGGTATCGATAAACC

GTGGATTGGTGCTGGCTTCGGTCTGGAACGTCTGC

TGAAAGTTAAGCACGACTTTAAGAACATCAAACGT

GCTGCGCGTTCCGAGTCCTATTACAACGGCATTAG

CACTAACCTGTAAGTCGACCAAACAATCCAAAACG

CCGCGTTCAGCGGCGTTTTTTCTGCTTTTGCGGCC

GCTGTGCTTCTCAAATGCCTGAGGCCAGTTTGCTC

AGGCTCTCCCCGTGGAGGTAATAATTGACGATATG

ATCAGTGCACGGCTAACTAAGCGGCCTGCTGACTT

TCTCGCCGATCAAAAGGCATTTTGCTATTAAGGGA

TTGACGAGGGCGTATCTGCGCAGTAAGATGCGCCC

CGCATTGGAAACCTGATCATGTAGATCGAATGGAC

TCTAAATCCGTTCAGCCGGGTTAGATTCCCGGGGT

TTCCGCCAAATTCGAAAAGCCTGCTCAACGAGCAG

GCTTTTTTGCATG
```

Figure 5:
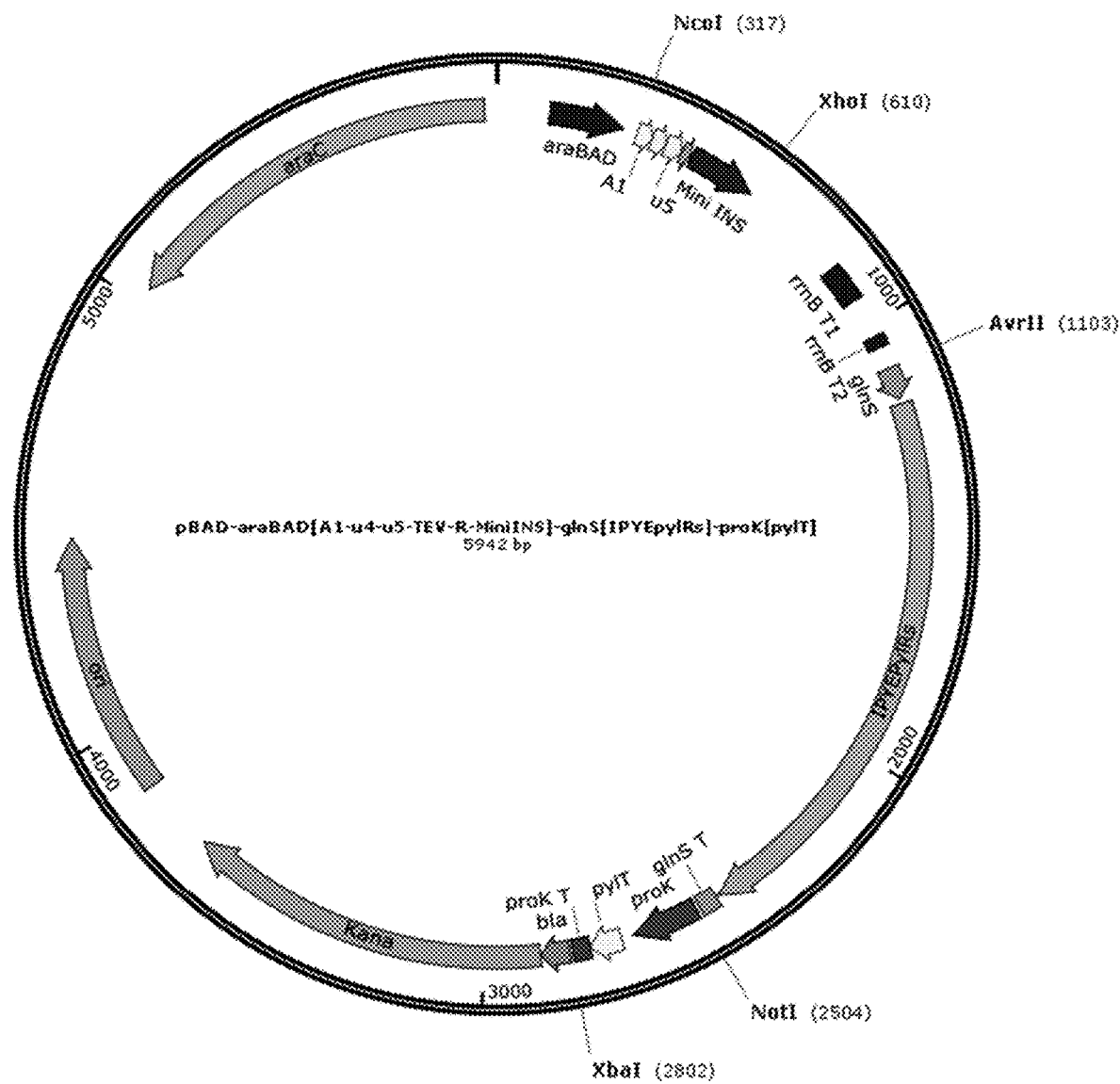
FIG. 5 shows a map of plasmid pBAD-araBAD [A1-u4-u5-TEV-R-MiniINS]-glnS [IPYEpylRs]-proK [pylT].

The sequence shown in SEQ ID NO: 14 was cut from the cloning vector pUC57-glnS [pylRs]-proK [pylT] with restriction enzymes AvrII and XbaI, while the plasmid pBAD-A1-u4-u5-TEV-R-MiniINS was cut with AvrII and XbaI. Then the products were separated by nucleic acid electrophoresis, extracted with agarose gel DNA recovery kit, ligated with T4 DNA Ligase, and transformed into large E. coli Top10 competent cells by chemical method ($CaCl_2$ method). The transformed cells were cultured on LB agar medium (10 g/L yeast peptone, 5 g/L yeast extract powder, 10 g/L NaCl, 1.5% agar) containing chloramphenicol at 37° C. overnight. A single live colony was picked and cultured in liquid LB medium (10 g/L yeast peptone, 5 g/L yeast extract powder, 10 g/L NaCl) containing chloramphenicol at 37° C. at 220 rpm overnight. Glycerol at a final concentration of 20% was added to preserve the strain The plasmid was extracted with a Plasmid Mini Extraction Kit, and the obtained plasmid was named pBAD-araBAD[A1-u4-u5-TEV-R-MiniINS]-glnS [IPYEpylRs]-proK[pylT]. The map of the plasmid is shown in FIG. 5.

Example 3 Expression Strain Construction of Double-Plasmid and High-Density Expression of t-Butyloxycarboryl (Boc) Modified Fusion Protein Plasmid pEvol-pylRs-pylT, plasmid pEvol-suppylRs-pylT, plasmid pEvol-IPYEpylRs-pylT, plasmid pEvol-optpylRs-pylT, and plasmid pEvol-IPYEpylRs (L274A, C313 S, F349Y)-pylT were respectively co-transformed with insulin fusion protein expression vector pBAD-INS (the plasmid was constructed by our company; kanamycin resistance) into E. coli Top10 competent cells (competent cells were purchased from Thermo) by chemical method ($CaCl_2$) method). The transformed cells were cultured on LB agar medium (10 g/L yeast peptone, 5 g/L yeast extract powder, 10 g/L NaCl, 1.5% agar) containing 25 µg/mL kanamycin and 17 µg/mL chloramphenicol at 37° C. overnight. A single live colony was picked and cultured in liquid LB medium (10 g/L yeast peptone, 5 g/L yeast extract powder, 10 g/L NaCl) containing 25 µg/mL kanamycin and 17 µg/mL chloramphenicol at 37° C. at 220 rpm overnight. Glycerol was added at a final concentration of 20% to preserve the strain.

Each strain was inoculated into liquid LB medium, cultured at 37° C. and 220 rpm overnight, then was inoculated at 1% (v/v) in the fermentor with the fermentation medium (12 g/L yeast peptone, 24 g/L yeast extract powder, 4 mL/L glycerol, 12.8 g/L disodium hydrogen phosphate, 3 g/L potassium dihydrogen phosphate, 0.3%0 defoamer), and was cultured at 35(±3)° C., 200-1000 rpm, air flow 2-6 L/min. After culturing for 3-10 hours, the feed medium containing glycerol and yeast peptone was supplied at a stepped rate until the end of the fermentation. After culturing until $OD_{600}$ reached 25-80, L-ara at the final concentration of 0.25% and Boc-Lys at the final concentration of 5 mM were added for induction. Cultivation was continued until $OD_{600}$ reached 180-220, then the fermentation broth was released from the fermentor. Various strains were collected by centrifugation (5000 rpm, 30 min, 25° C.). SDS-polyacrylamide electrophoresis was used to detect the expression of fusion proteins containing Boc modified lysines in whole cells of various strains.

The fusion proteins were expressed in the form of insoluble "inclusion bodies". In order to release the inclusion bodies, the Escherichia coli cells were disrupted with a high-pressure homogenizer. Nucleic acids, cell debris and soluble proteins were removed by centrifugation at 10000 g. The inclusion bodies containing the fusion proteins were washed with pure water, and the obtained precipitate of inclusion bodies was used as the raw material for folding.

The expression amount of fusion proteins of different mutant enzymes are shown in the following table.

| Enzyme | Expression of Boc-lysine fusion protein (g/L fermentation broth) |
| --- | --- |
| Wild-type pylRs (SEQ ID NO: 1) | 7.9 |
| suppylRs (SEQ ID NO: 3) | 14.4 |
| IPYEpylRs (SEQ ID NO: 4) | 15.0 |
| optpylRs (SEQ ID NO: 5) | 15.1 |
| IPYEpylRs (L274A, C313S, F349Y) (SEQ ID NO: 6) | 8.0 |
| Single-plasmid IPYEpylRs (SEQ ID NO: 4) | 12.8 |

In order to refold the fusion proteins, the inclusion bodies were dissolved in a 7.5M urea solution with pH of 10.5 containing 2-10 mM mercaptoethanol so that the total protein concentration after dissolution reached 10-25 mg/mL. The sample was diluted 5-10 times, and conventional folding was performed for 16-30 hours at 4-8° C. with pH of 10.5-11.7. At 18-25° C., the pH value was maintained between 8.0-9.5, and the fusion proteins were enzymatically hydrolyzed with trypsin and carboxypeptidase B for 10-20 hours, and then 0.45M ammonium sulfate was added to terminate the enzymolysis. The analysis results of reversed-phase HPLC showed that the yield of the enzymolysis procedure was higher than 90%. Insulin analogues obtained after the digestion with trypsin and carboxypeptidase B were named BOC-lysine insulins. Boc-lysine insulins were not enzymatically hydrolyzed under the above conditions. The samples were clarified by membrane filtration and initially purified by hydrophobic chromatography with 0.45 mM ammonium sulfate as a buffer solution, and the sample purity of SDS-polyacrylamide gel electrophoresis reached 90%. In addition, the obtained Boc-human insulins were analyzed by MALDI-TOF mass spectrometry, and it was found that its molecular weight was consistent with the theoretical molecular weight of 5907.7 Da. The samples were eluted and collected by hydrophobic chromatography, and hydrochloric acid was added to carry out the deprotection reaction of Boc-human insulins. Sodium hydroxide solution was added to control the pH value between 2.8-3.2 to terminate the reaction. After two steps of high pressure reversed-phase chromatography, the yield of recombinant human insulins was higher than 85%.

The expression amount of recombinant human insulins of different mutant enzymes are shown in the following table:

| Enzyme | Production of human insulins (mg/L fermentation broth) |
| --- | --- |
| Wild-type pylRs | 360 |
| suppylRs | 715 |
| IPYEpylRs | 740 |
| optpylRs | 760 |
| IPYEpylRs (L274A, C313S, F349Y) | 370 |
| Single-plasmid IPYEpylRs | 630 |

The results showed that the use of the mutant enzymes of the present invention to prepare target proteins containing Boc-lysine can significantly increase the insertion amount of unnatural amino acids and the amount of target proteins containing unnatural amino acids.

Example 4 Expression Strain Construction of Double-Plasmid and High-Density Expression of Butynyloxycarbonyl Modified Fusion Protein Plasmid pEvol-pylRs-pylT, plasmid pEvol-suppylRs-pylT, plasmid pEvol-IPYEpylRs-pylT, plasmid pEvol-optpylRs-pylT and plasmid pEvol-IPYEpylRs (L274A, C313 S, F349Y)-pylT were respectively co-transformed with insulin fusion protein expression vector pBAD-INS (the plasmid was constructed by our company; kanamycin resistance) into E. coli Top10 competent cells (competent cells were purchased from Thermo) by chemical method (CaCl$_2$) method). The transformed cells were cultured on LB agar medium (10 g/L yeast peptone, 5 g/L yeast extract powder, 10 g/L NaCl, 1.5% agar) containing 25 µg/mL kanamycin and 17 µg/mL chloramphenicol at 37° C. overnight. A single live colony was picked and cultured in liquid LB medium (10 g/L yeast peptone, 5 g/L yeast extract powder, 10 g/L NaCl) containing 25 µg/mL kanamycin and 17 µg/mL chloramphenicol at 37° C. at 220 rpm overnight. Glycerol was added at the final concentration of 20% to preserve the strain.

Each strain was inoculated in liquid LB medium and cultured at 37° C. and 220 rpm overnight, then was inoculated at 1% (v/v) in the fermentor with the fermentation medium (12 g/L yeast peptone, 24 g/L yeast extract powder, 4 mL/L glycerol, 12.8 g/L disodium hydrogen phosphate, 3 g/L potassium dihydrogen phosphate, 0.3%0 defoamer), and was cultured at 35(±3)° C., 200-1000 rpm, air flow 2-6 L/min. After culturing for 3-10 hours, the feed medium containing glycerol and yeast peptone was supplied at a stepped rate until the end of the fermentation. After culturing until OD$_{600}$ reached 25-80, L-ara at the final concentration of 0.25% and Butynyloxycarbonyl-Lys at the final concentration of 5 mM were added for induction. Cultivation was continued until OD$_{600}$ reached 180-220, then the fermentation broth was released from the fermentor. Various strains were collected by centrifugation (5000 rpm, 30 min, 25° C.). SDS-polyacrylamide electrophoresis was used to detect the expression of fusion proteins containing butynyloxycarbonyl modified lysines in whole cells of various strains.

| Enzyme | Expression of butynyloxycarbonyl-lysine fusion protein (g/L fermentation broth) |
| --- | --- |
| Wild-type pylRs | 4.5 |
| suppylRs | 6.3 |
| IPYEpylRs | 6.0 |
| optpylRs | 6.2 |
| IPYEpylRs (L274A, C313S, F349Y) | 8.8 |
| Single-plasmid IPYEpylRs | 5.0 |

The fusion proteins were expressed in the form of insoluble "inclusion bodies". In order to release the inclusion bodies, the E. coli cells were disrupted with a high-pressure homogenizer. Nucleic acids, cell debris and soluble proteins were removed by centrifugation at 10000 g. The inclusion bodies containing the fusion proteins were washed with pure water, and the obtained precipitate of inclusion bodies was used as the raw material for folding. In order to refold the fusion proteins, the inclusion bodies were dissolved in a 7.5M urea solution with pH of 10.5 containing 2-10 mM mercaptoethanol so that the total protein concentration after dissolution reached 10-25 mg/mL. The sample was diluted 5-10 times, and conventional folding was performed for 16-30 hours at 4-8° C. with pH of 10.5-11.7. At 18-25° C., the pH value was maintained between 8.0-9.5, and the fusion proteins were enzymatically hydrolyzed with trypsin and carboxypeptidase B for 10-20 hours, and then 0.45M ammonium sulfate was added to terminate the enzymolysis. The analysis results of reversed-phase HPLC showed that the yield of the enzymolysis procedure was higher than 90%. Insulin analogues obtained after the digestion with trypsin and carboxypeptidase B were named butynyloxycarbonyl-lysine insulins. Butynyloxycarbonyl-lysine insulins were not enzymatically hydrolyzed under the above conditions. The samples were clarified by membrane filtration and initially purified by hydrophobic chromatography with 0.45 mM ammonium sulfate as a buffer solution, and the sample purity of SDS-polyacrylamide gel electrophoresis reached 90%. In addition, the obtained butynyloxycarbonyl-human insulins were analyzed by MALDI-TOF mass spectrometry, and it was found that its molecular weight was consistent with the theoretical molecular weight of 5907.7 Da.

| Enzyme | Production of butynyloxycarbonyl-human insulins (mg/L fermentation broth) |
| --- | --- |
| Wild-type pylRs | 530 |
| suppylRs | 720 |
| IPYEpylRs | 700 |
| optpylRs | 730 |
| IPYEpylRs (L274A, C313S, F349Y) | 1050 |
| Single-plasmid IPYEpylRs | 590 |

The results showed that the use of the mutant enzymes of the present invention to prepare butynyloxycarbonyl modified target proteins can significantly increase the insertion amount of unnatural amino acids and the amount of target proteins containing unnatural amino acids.

All documents mentioned in the present invention are incorporated by reference herein as if each document were incorporated separately by reference. Furthermore, it should be understood that after reading the foregoing teachings of the invention, various changes or modifications may be made to the invention by those skilled in the art and that these equivalents also fall in the scope of the claims appended to this application.

The invention claimed is:

1. A mutant protein of aminoacyl-tRNA synthetase, which comprises:
   (1) a deletion mutation of amino acid residue at position 102, positions 128-140, and positions 159-179 in an amino acid sequence corresponding to a wild-type aminoacyl-tRNA synthetase; or
   (2) a deletion mutation of amino acid residues at position 102, positions 128-140, and positions 159-179 in an amino acid sequence corresponding to a wild-type aminoacyl-tRNA synthetase by replacing positions 1-184 of the wild-type aminoacyl-tRNA synthetase with another segment of amino acids at positions 1-149 of SEQ ID NO: 4; and an amino acid mutation of Y384F corresponding to a wild-type aminoacyl-tRNA synthetase; or
   (3) on the basis of (2), further mutations of H29Y, D76G, S89G, N91T, R96K, S121P, N129D, S145P and A148T, as related to SEQ ID NO: 4; or
   (4) on the basis of (2), further mutations of L274A, C313S, and F349Y, as related to SEQ ID NO: 4;
   Wherein the amino acid sequence of the wild-type aminoacyl-tRNA synthetase is shown in SEQ ID NO: 1 or 2; and
   except for the deletion and the mutation, the other amino acids of the mutant protein are the same as the sequence as shown in SEQ ID NO: 1 or SEQ ID NO: 2.

2. The mutant protein of claim 1, wherein the amino acid sequence of the mutant protein is shown in any one of SEQ ID NOs: 3-6.

3. An isolated polynucleotide encoding a mutant protein of claim 1.

* * * * *